US006788250B2

(12) United States Patent
Howell

(10) Patent No.: US 6,788,250 B2
(45) Date of Patent: Sep. 7, 2004

(54) BEAMFORMER FOR MULTI-BEAM BROADCAST ANTENNA

(75) Inventor: James M. Howell, Woodstock, GA (US)

(73) Assignee: EMS Technologies, Inc., Norcross, GA (US)

( * ) Notice: Subject to any disclaimer, the term of this patent is extended or adjusted under 35 U.S.C. 154(b) by 0 days.

(21) Appl. No.: 10/290,985

(22) Filed: Nov. 8, 2002

(65) Prior Publication Data

US 2003/0090418 A1 May 15, 2003

Related U.S. Application Data

(60) Provisional application No. 60/344,634, filed on Nov. 9, 2001.

(51) Int. Cl.[7] ................................................ H01Q 3/22
(52) U.S. Cl. ...................................... 342/372; 342/377
(58) Field of Search ................................ 342/371, 372, 342/373, 377; 455/562.1

(56) References Cited

U.S. PATENT DOCUMENTS

| | | | |
|---|---|---|---|
| 4,060,806 A | | 11/1977 | Davies et al. |
| 4,217,587 A | | 8/1980 | Jacomini |
| 4,277,787 A | * | 7/1981 | King ............................ 342/371 |
| 4,720,712 A | | 1/1988 | Brookner et al. |
| 4,901,307 A | | 2/1990 | Gilhousen et al. |
| 4,965,602 A | * | 10/1990 | Kahrilas et al. ............. 342/372 |
| 5,821,901 A | | 10/1998 | Zagrodnick et al. |
| 5,825,762 A | * | 10/1998 | Kamin et al. ................ 370/335 |
| 5,864,548 A | | 1/1999 | Liu |
| 5,903,549 A | * | 5/1999 | von der Embse et al. .. 370/310 |
| 5,953,325 A | | 9/1999 | Willars |
| 5,986,590 A | | 11/1999 | Smith et al. |
| 6,064,338 A | | 5/2000 | Kobayakawa et al. |
| 6,122,260 A | | 9/2000 | Liu et al. |
| 6,169,513 B1 | * | 1/2001 | Cohen .......................... 342/354 |
| 6,222,498 B1 | | 4/2001 | Ishii et al. |
| 6,232,921 B1 | | 5/2001 | Aiken et al. |
| 6,507,315 B2 | * | 1/2003 | Purdy et al. ................. 342/374 |
| 2001/0034236 A1 | * | 10/2001 | Tong et al. ................... 455/450 |
| 2003/0026348 A1 | * | 2/2003 | Llang et al. ................. 375/267 |

FOREIGN PATENT DOCUMENTS

| | | | |
|---|---|---|---|
| EP | 0 939 452 A2 | 9/1999 | |
| EP | 001115232 A2 | * 7/2001 | ........... H04L/23/02 |
| WO | WO 95/22210 | 8/1995 | |
| WO | WO 01/22926 A1 | 4/2001 | |

OTHER PUBLICATIONS

Pedersen, Klaus I., et al, "A Simple Downlink Antenna Array Algorithm Based on a Hybrid Scheme of Transmit Diversity and COnventionaly Beamforming," IEEE 53rd Vehicular technology Conf, May 2001, pp. 58–62 vol. 1.*

* cited by examiner

Primary Examiner—Gregory C. Issing
(74) Attorney, Agent, or Firm—Michael J. Mehrman; Mehrman Law Office PC

(57) ABSTRACT

A phased array antenna system operative to broadcast multiple beams that each include coded data for specific users located within the coverage area of the corresponding beam. An appropriate receiver then receives and decodes a particular beam to extract the specific data for a corresponding user. Multiple users may be assigned to each beam using frequency division or orthogonal code multiplexing, and the user data may be encoded into the beams using frequency shift key or phase shift key encoding. For each coding technique, the encoded antenna control signals are combined into a total gain and total phase shift control signal, which drives a single phase and gain control device for each antenna element. In addition, a single data modulator generates the coding parameters for the entire communication system.

37 Claims, 17 Drawing Sheets

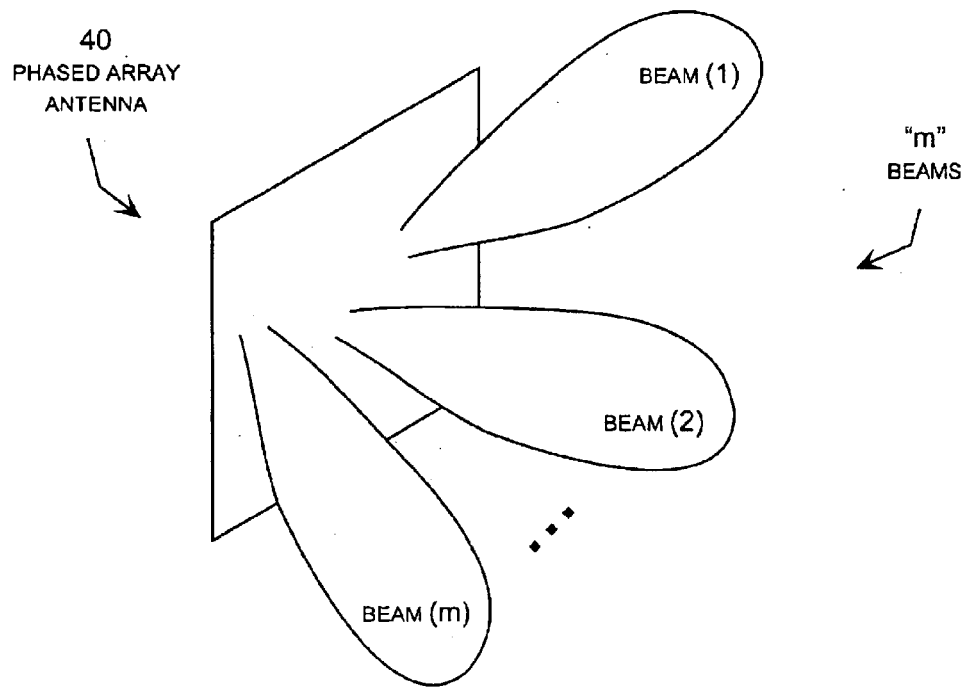

*FIG. 7*

$$B(i) = \boxed{\begin{array}{c}AE\,(1)\\COMPONENT\end{array}} + \boxed{\begin{array}{c}AE\,(2)\\COMPONENT\end{array}} + \cdots \boxed{\begin{array}{c}AE\,(n)\\COMPONENT\end{array}}$$

$$B(i) = \sum_{j=1}^{n} AE\,(j)\ COMPONENT \quad \overset{92}{\leftarrow}$$

$$AE(j) = \boxed{\begin{array}{c}B(1)\\COMPONENT\end{array}} + \boxed{\begin{array}{c}B(2)\\COMPONENT\end{array}} + \cdots \boxed{\begin{array}{c}B(m)\\COMPONENT\end{array}}$$

$$AE(j) = \sum_{i=1}^{m} B\,(i)\ COMPONENT \quad \overset{94}{\leftarrow}$$

*FIG. 8*

$$B(i) = \sum_{j=1}^{n} a_{ij} e^{j\phi_{ij}}$$

92 BEAM EQUATION

$$B(i) = \underbrace{a_{i1} e^{j\phi^o_{i1}}}_{AE(1)\ COMPONENT} + \underbrace{a_{i2} e^{j\phi^o_{i2}}}_{AE(2)\ COMPONENT} + \cdots \underbrace{a_{in} e^{j\phi^o_{in}}}_{AE(n)\ COMPONENT}$$

$$AE(j) = \sum_{i=1}^{m} a_{ij} e^{j\phi^o_{ij}}$$

94 ANTENNA ELEMENT EQUATION

$$AE(j) = \underbrace{a_{1j} e^{j\phi^o_{1j}}}_{B(1)\ COMPONENT} + \underbrace{a_{2j} e^{j\phi^o_{1j}}}_{B(2)\ COMPONENT} + \cdots \underbrace{a_{mj} e^{j\phi^o_{1j}}}_{B(m)\ COMPONENT}$$

$$[a_{ij}\ \phi^o_{ij}] \quad \begin{array}{l} i = 1 \rightarrow m\ (\text{BEAMS}) \\ j = 1 \rightarrow n\ (\text{ELEMENTS}) \end{array}$$

BEAM NO. ↗  ↖ ELEMENT NO.

96 BEAM PARAMETERS

$a_{11}\ \phi^o_{11}\ ;\ a_{21}\ \phi^o_{21}\ ;\ \ldots\ a_{m1}\ \phi^o_{m1}$ } ELEMENT (1) PARAMETERS $a_{12}\ \phi^o_{12}\ ;\ a_{22}\ \phi^o_{22}\ ;\ \ldots\ a_{m2}\ \phi^o_{m2}$ } ELEMENT (2) PARAMETERS $\vdots \qquad \vdots \qquad \qquad \vdots$ $a_{1n}\ \phi^o_{1n}\ ;\ a_{2n}\ \phi^o_{21}\ ;\ \ldots\ a_{mn}\ \phi^o_{mn}$ } ELEMENT (n) PARAMETERS $\underbrace{\phantom{a_{1n}\ \phi^o_{1n}}}_{\text{BEAM (1) PARAMETERS}} \quad \underbrace{\phantom{a_{2n}\ \phi^o_{21}}}_{\text{BEAM (2) PARAMETERS}} \quad \underbrace{\phantom{a_{mn}\ \phi^o_{mn}}}_{\text{BEAM (m) PARAMETERS}}$

*FIG. 9*

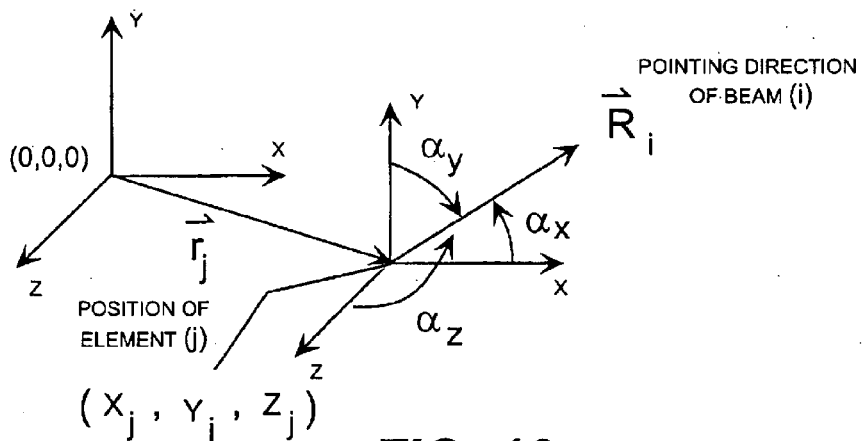

FIG. 10

GAIN - $a_{ij}$ = ASSIGNED FOR DESIRED BEAM CHARACTERISTIC

INITIAL PHASE SHIFT - $\phi^o_{ij} = k \vec{r_j} \cdot \vec{R_i}$

CONSTANT - $k = \dfrac{2\pi}{\lambda}$ ← WAVELENGTH

ANTENNA ELEMENT POSITION - $\vec{r_j} = (X_j, Y_j, Z_j)$

BEAM ORIENTATION - $\vec{R_i} = (\cos\alpha_x, \cos\alpha_y, \cos\alpha_z)$

UNITY VECTOR - $|\vec{R_i}| = 1$ $$\phi^o_{ij} = k\vec{r_j} \cdot \vec{R_i} = \dfrac{2\pi}{\lambda}(X_j\cos\alpha_x, Y_j\cos\alpha_y, Z_j\cos\alpha_z)$$

FIG. 11

Phase / Gain Control Signals $$\hat{a}_j(t_x) = \sqrt{I_j^2(t_x) + Q_j^2(t_x)} \quad = \text{TOTAL GAIN}$$

$$\hat{\phi}_j(t_x) = \tan^{-1}\left(\frac{I_j(t_x)}{Q_j(t_x)}\right) \quad = \text{TOTAL PHASE SHIFT}$$

$$I_j(t_x) = \sum_{i=1}^{m}\sum_{k=1}^{p} a_{ij} \cos\left[\phi_{ij}^o + [data(t_x)]\right] = \text{SUM IN-PHASE COMPONENTS}$$

$$Q_j(t_x) = \sum_{i=1}^{m}\sum_{k=1}^{p} a_{ij} \sin\left[\phi_{ij}^o + [data(t_x)]\right] = \text{SUM QUADRATURE COMPONENTS}$$

*FIG. 16*

Example 1A – Frequency Multiplex - Phase Shift Key Data Coding $$I_j(t_x) = \sum_{i=1}^{m}\sum_{k=1}^{p} a_{ij} \cos\left[\phi_{ij}^{\circ} + 2\Pi t_k \delta_{ik} + D_{ik}(t_x)\right]$$

$$Q_j(t_x) = \sum_{i=1}^{m}\sum_{k=1}^{p} a_{ij} \sin\left[\phi_{ij}^{\circ} + 2\Pi t_k \delta_{ik} + D_{ik}(t_x)]\right]$$

where $D_{ik} = 0^{\circ}$ or $180^{\circ}$ = data 1 or 0

Example 1B – Frequency Multiplex - Frequency Shift Key Data Coding $$I_j(t_x) = \sum_{i=1}^{m}\sum_{k=1}^{p} a_{ij} \cos\left[\phi_{ij}^{\circ} + 2\Pi t_x \delta_{ik}(t_x)\right]$$

$$Q_j(t_x) = \sum_{i=1}^{m}\sum_{k=1}^{p} a_{ij} \sin\left[\phi_{ij}^{\circ} + 2\Pi t_x \delta_{ik}(t_x)\right]$$

where $\delta_{ik}(t_x) = \delta_{ik}^{\circ} + \dfrac{\delta f}{2}$ or $\delta_{ik}^{\circ} - \dfrac{\delta f}{2}$ = data 1 or 0

Example 2– Orthogonal Code Multiplex – Phase Shift Key Data Coding $$I_j(t_x) = \sum_{i=1}^{m}\sum_{k=1}^{p} a_{ij} \cos\left[\phi_{ij}^{\circ} + CDMA_{ik}(t_x) \oplus D_{ik}(t_x)\right]$$

$$Q_j(t_x) = \sum_{i=1}^{m}\sum_{k=1}^{p} a_{ij} \sin\left[\phi_{ij}^{\circ} + CDMA_{ik}(t_x) \oplus D_{ik}(t_x)\right]$$

where $D_{ik} = 0^{\circ}$ or $180^{\circ}$ = data 1 or 0

FIG. 17

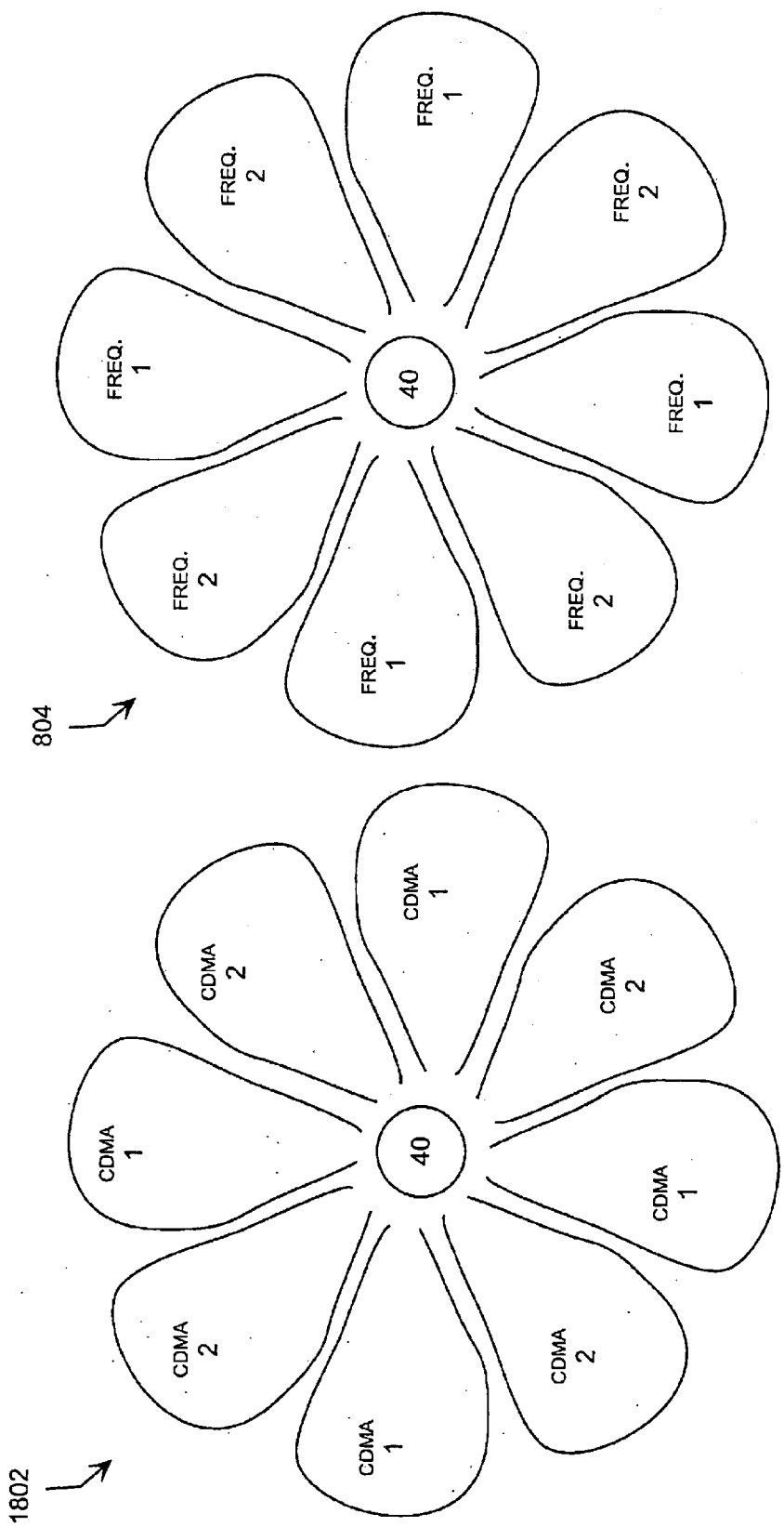

BEAMFORMER FOR MULTI-BEAM BROADCAST ANTENNA

CROSS-REFERENCE TO RELATED APPLICATIONS

This application claims priority to commonly-owned U.S. Provisional Patent Application Serial No. 60/344,634 entitled "Virtual Beamformer For Communication Applications" filed Nov. 9, 2001.

TECHNICAL FIELD

The present invention relates to phased array antenna broadcast systems, such as those used for mobile telephone and other data communication systems, and more particularly relates to a beam former that generates encoded control signals that drive the antenna elements of a phased array to transmit multiple beams that each carry unique data directed to multiple users receiving the corresponding beam.

BACKGROUND OF THE INVENTION

Phased array antenna broadcast systems, such as those used for mobile telephone and other data communication systems, take advantage of the phase differential that occurs according to the direction of coherent propagating energy. For example, in a simple array of two closely spaced antenna elements lying in a plane and both facing forward, an incoming signal coming straight from the forward direction would be received at the same time at both elements, resulting in signals at each element having the same phase, which are referred to as "in-phase." But if the energy approaches the elements at an angle, the two elements receive the energy at different times, resulting in a phase differential or "shift" between the two signals. This is similar to ocean waves arriving at a beach. If the wave comes straight in to shore, the wave washes upon the beach at the same time along the beach. If the wave is coming in at an angle relative to the beach, however, it arrives first in one spot and then progressively arrives down the beach at later times.

A similar phenomenon is at work in phased array antenna systems. Since the propagating electromagnetic energy reaches the nearest antenna element first, the direction of the incoming energy can be determined by detecting the phase differential. Similarly, energy emitted from the antenna may be pointed in a particular direction by controlling the phase angles of the signals emitted from the antenna elements. For example, a directional "beam" may be formed by emitting signals from the antenna elements with coordinated phase delays, which causes the emitted energy to add up constructively in a desired beam direction while partially or completely canceling out in all other directions. It is common to steer a coherent beam created in this manner by controlling programmable phase and gain control devices at each antenna element in a coordinated manner. For example, a single beam formed by a phased array may be controlled to periodically sweep across the antenna's angular coverage, to track an intended receiver, to sweep or track while avoiding a known signal, or to achieve other objectives. This conventional beam steering system uses a single controllable phase and gain control device for each antenna element and a beam steering computer to create and control the beam.

It is also conventional to use a phased array antenna system to simultaneously broadcast multiple beams having different pointing directions. For example, rather than steering one beam to sweep across the antenna's angular coverage, as described above, the phased array may be controlled to divide the antenna's angular, coverage into multiple beams to broadcast data throughout the entire operational volume simultaneously. In addition, systems have been developed that can use a phased array antenna to broadcast different data in each beam. This is accomplished conventionally by dividing the signal emitted by each antenna element into separate beams for each user using separate phase and gain control devices at each antenna element for each user. That is, a separate beam is typically defined for each user containing that particular user's data. This typically requires a separate phase and gain control device at each antenna element for each user, and a separate data modulator for each user. In other words, the data signals for the individual users are conventionally formed by providing a separate data modulator and separate sets of antenna hardware at each antenna element for each user, which generally multiplies the required number of antenna hardware elements by the number of simultaneous users. This may be considered a "brute force" design technique due to the heavy dependence on antenna hardware to generate the desired beams.

However, applying this technology to a typical mobile telephone system would be prohibitively expensive and unwieldy. For example, the phased array antenna for a typical transmit base station might include 30 antenna elements that generate 10 simultaneous beams to serve 10,000 users. In this case, each of the 30 antenna elements would require 10,000 phase and gain control devices, resulting in 300,000 phase and gain control devices. The system would also require 10,000 data modulators to create the data signals for the 10,000 individual users. This approach would require 300,000 phase and gain devices and 10,000 data modulators, which would result in a system that is exorbitantly expensive, complex to construct, large in size, and heavy. Any one or more of these penalties may be critical for a particular application.

Alternatively, systems have been developed in which the data signals for the various users assigned to a particular beam are combined before they are supplied to the antenna elements. As a result, in this type of system each antenna element requires a separate phase and gain control device for each beam, rather than a separate phase and gain control device for each user. Although this design choice drastically reduces the number of phase and gain control devices, the system also requires a combiner for each beam. Referring to the previous example, this type of system would require 300 phase and gain control devices (i.e., one for each of the 10 beams at each of the 30 antenna elements), 10 beam combiners (i.e., one for each of the 10 beams) and 10,000 data modulators to create the data signals for the 10,000 individual users. Although the number of phase and gain control devices is greatly reduced, this type of system would still require a very large number of data communication hardware components, including 10,000 data modulators.

Accordingly, a need exists for improved methods and systems for broadcasting data using multiple beams with a phased array antenna system. In particular, a need exists for phased array antenna systems that can broadcast data to multiple users using multiple beams without dedicating a separate phase and gain control device to each user or each beam at each antenna element, and without requiring a separate data modulator for each user.

SUMMARY OF THE INVENTION

The present invention meets the needs described above in a phased array data communication system that uses an intelligent beam former to drive the antenna array to broadcast multiple data-containing beams using a single programmable phase and gain control device for each antenna element, and a single data modulator to serve all of the users. The intelligent beam former assigns multiple users to each beam and encodes each beam with the data for the corresponding users. The beam former then creates a combined control signal for each antenna element that contains the encoded data, and broadcasts the data by applying the control signal for each antenna element to a single phase and gain control device for each antenna element. This control signal for each antenna element includes a total gain and total phase shift that represents the vector sum of encoded data signals for users assigned to the various beams. For example, multiple users may be assigned to each beam using frequency division or orthogonal code multiplexing, and the user data may be encoded into the beams using frequency shift key or phase shift key encoding.

Advantageously, the present invention may be used to transmit unique data to a large number of users using a multi-beam phased array antenna system having a single programmable phase and gain control device for each antenna element, and a single data modulator for the entire system. That is, the invention allows a beam encoder implemented through software running on a beam forming computer, and cooperating filters and beam decoders located in the receiving devices, such as conventional CDMA or frequency filters with cooperating frequency shift key or phase shift key decoders, to effectively replace the multiplicity of antenna hardware and data modulators found in conventional multi-beam phased array antenna data communication systems. The resulting system, which includes a single data modulator and a single phase and gain control device for each antenna element, requires far less antenna and data communication hardware than previous systems designed to accomplish similar communication objectives. Moreover, the data modulators used for the embodiments of the present invention are implement in software and, therefore, only require a small section of digital signal processing code implemented within the beam forming computer. This software replace a large amount of data modulator hardware used in prior systems, such as digital circuitry, intermediate frequency amplitude and/or phase modulators, and up-converters to the desired RF frequency.

The beam forming computer may also control multiple antennas, change the antennas under control on demand, change beam patterns on demand, change code sets on demand, and switch between encoding methodologies on demand to avoid interference on certain channels, implement security measures, or achieve other objectives. Since the present invention implements all of these capabilities through software applied to standard antenna and data communication hardware, a very wide range of phased array antenna systems can be manufactured or upgraded to include these capabilities without substantially increasing the cost, complexity, size, or weight of the systems.

Generally described, the methodology of the invention may be implemented on a beam forming computer, which may be local or remote, or it may be expressed in computer-executable instructions stored on a computer storage medium. The beam forming computer implements a method for operating a phased array data communication system having a number of antenna elements. The system receives data for a number of users and assigns the data to a number of beams. The system then encodes each beam with the data for the corresponding users and generates control signals to drive the antenna elements to generate the beams. In particular, the control signal for each element is composed of a total gain and a total phase shift, such that the combination of the control signals generated for all of the antenna elements causes the antenna to emit the several beams in which each beam carries encoded data for its assigned users. The system then broadcasts the beams to deliver the data to the users.

The system typically assigns the user data to the various beams by determining a location associated with each user and identifying a coverage area associated with each beam. The system then assigns the user data to the beams so that the location of each user corresponds to the coverage area of the associated beam. This allows each user to receive an associated beam containing the data directed to that user, and to decode the received beam to recover that user's associated data. In addition, the system may broadcast data in this manner using a number of different desired antennas, beam sets, and code sets. That is, the system may change the selected antenna, beam set, and code set on demand to avoid interference, to implement security measures, and to achieve other objectives.

For any desired antenna, beam set, and code set, the system typically assigns multiple users to each beam and encodes each beam with the data for the corresponding users by defining a control signal for each antenna element in which each control signal is composed of beam components corresponding to the various beams. In particular, the system computes the total gain and a total phase shift for each antenna element from the vector sum of the beam components associated with the corresponding antenna element. In addition, the system encodes each beam component with the data for the corresponding users by computing a vector sum of data signals for users assigned to the corresponding beam, in which each data signal includes a coding parameter representing data for a corresponding user.

More specifically, the system typically encodes each beam with the data for the corresponding users by computing an in-phase component for the control signal for each antenna element composed of a vector projection sum of in-phase beam components for the corresponding antenna element. The system also computes a quadrature component for the control signal for each antenna element composed of a vector projection sum of quadrature beam components for the corresponding antenna element. The system then computes a total gain and a total phase shift for each antenna element from the corresponding in-phase and quadrature components. Specifically, the in-phase component for each antenna element preferably includes an in-phase component corresponding to each beam. Similarly, the quadrature beam components for each antenna element preferably include a quadrature component corresponding to each beam.

In various embodiments, multiple users may be assigned to each beam using orthogonal code multiplexing, and the user data may be encoded into each beam using a phase shift key encoding technique. In this case, the appropriate beam may be received and decoded to recover the appropriate data using an orthogonal code filter, such as a conventional CDMA filter. Alternatively, multiple users may be assigned to each beam using frequency division multiplexing, and the user data may be encoded into each beam using frequency shift key encoding or phase shift key encoding. For these alternatives, the appropriate beam may be received with a conventional frequency filter and the received beam may be decoded to recover the appropriate data using a conventional frequency shift key or phase shift key decoder.

The invention may also be embodied as a multi-beam phased array antenna system including a number of antenna elements and a phase and gain control device associated with each antenna element. The system may also include a beam forming computer configured to generate control signals to drive the phase and gain control devices to create multiple beams. The system may also include an antenna selector for selecting among a number of antennas, a code selector configured to identify desired coding parameter sets, and a beam selector configured to identify desired beam sets.

Typically, each beam is assigned data corresponding to users located within a coverage area associated with the corresponding beam, and the control signal for each antenna element includes a total gain and a total phase shift. For example, the control signal for each antenna element may include a vector sum of beam components in which one beam component corresponds to an associated beam. Each beam component may include a vector sum of data signals for users assigned to the corresponding beam, in which each data signal contains a coding parameter representing data for an associated user. In particular, the control signal for each antenna element typically includes an in-phase component defined by a sum of in-phase beam components for the corresponding antenna element. Further, the control signal for each antenna element may include a quadrature component defined by a sum of quadrature beam components for the corresponding antenna element. This allows the control signal for each antenna element to include a total gain and a total phase shift for the antenna element based on the in-phase and quadrature components for the corresponding antenna element. More specifically, the in-phase beam components for each antenna element may include an in-phase component corresponding to each beam. Similarly, the quadrature beam components for each antenna element may include a quardature component corresponding to each beam. In this manner, the coding parameters are embedded into the in-phase and quadrature beam components.

In view of the foregoing, it will be appreciated that the present invention avoids the drawbacks of prior methods for broadcasting data using multi-beam phased array antenna systems. The specific techniques and structures for embedding data in multiple-beams with minimal antenna hardware, and thereby accomplishing the advantages described above, will become apparent from the following detailed description of the embodiments and the appended drawings and claims.

BRIEF DESCRIPTION OF THE DRAWINGS

FIG. 7 is a generalized block diagram illustrating multiple beams formed by a phased array antenna.

FIG. 8 is a block diagram illustrating the composition of multiple beams from components emitted by various antenna elements, and illustrating a corresponding composition of the signals emitted by various antenna elements as components of multiple beams.

FIG. 9 illustrates the mathematical expression of antenna parameter, beams, and signals transmitted by various antenna elements.

FIG. 10 illustrates antenna beam parameter computed from antenna element positions and desired beam pointing directions.

FIG. 11 illustrates the mathematical derivation of antenna beam parameter computed from antenna element positions and desired beam pointing directions.

FIG. 16 illustrates generalized mathematical expressions for control signals for a multi-beam data communication system employing the beam forming technology of the present invention.

FIG. 17 illustrates specific mathematical expressions for control signals for a multi-beam data communication system using several different multiplexing and data encoding techniques.

FIG. 18A is a block diagram illustrating orthogonal code reuse in a multi-beam data communication system.

FIG. 18B is a block diagram illustrating frequency reuse in a multi-beam data communication system.

DETAILED DESCRIPTION OF THE EMBODIMENTS

Figure 1:
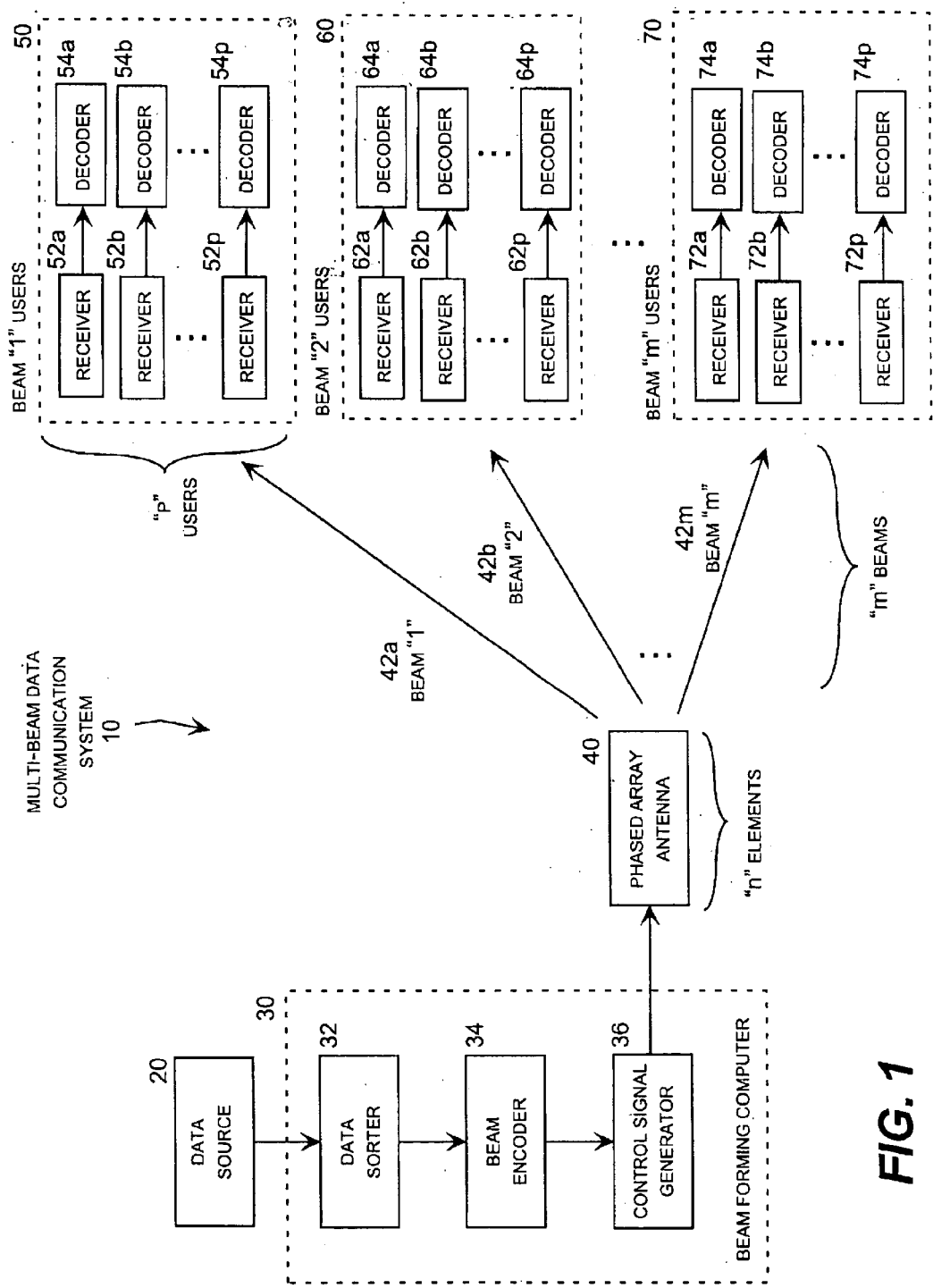
FIG. 1 is a block diagram of a multi-beam data communication system using a phased array antenna according to an embodiment of the present invention.

Briefly described, the invention may be embodied in a phased array data communication system that is operative to simultaneously generate multiple beams that each carry data directed to multiple users located within the corresponding beam. In particular, the phased array antenna may transmit multiple beams in which multiple users are multiplexed into each beam, and each beam is encoded with unique data for multiple users. This allows each beam to include unique data for multiple users located within a transmission coverage area associated with the corresponding beam. An appropriate receiver then receives the beam containing the corresponding user's data using an appropriate filter, and decodes the received beam to extract the data directed to the corresponding user using an appropriate decoder.

Using this encoding technique, multiple beams that each contain unique data directed to multiple users can be formed with a single set of antenna hardware for each antenna element instead of requiring a multiplicity of antenna hardware, one for each user or beam, as is needed in prior art multi-beam antenna systems. The system also uses a single data modulator for the entire system implemented in software, rather than requiring a separate hardware-based data modulator for each user, as is needed in prior art multi-beam antenna systems. This greatly reduces the cost, complexity, size and weight of the data communication system.

Preferably, multiple users are assigned to each beam using frequency division or orthogonal code multiplexing. Further, each beam is preferably encoded with the data for the assigned users using a frequency shift key or phase shift key encoding technique, although other coding techniques can be employed. Each user's receiver then receives the beam containing that user's data using an appropriate filter, and the user's unique data is extracted from the received beam using an appropriate decoder. For each coding technique, the encoded antenna signals to be emitted by each antenna element are controlled by a total gain and total phase shift control signal applied to a single phase and gain control device for each antenna element. However, each control signal is composed of a vector sum of beam components, and each beam component is composed of a vector sum of data signals for the individual users assigned to that beam. This allows the combination of the signals emitted by the antenna elements to form an arbitrary number of "m" beams that each carry data for an arbitrary number of "p" individual users. In addition, a single data modulator generates the coding parameters for the entire system, which are embedded into the antenna element control signals through the antenna control software implemented by a beam forming computer. Therefore, a separate data modulator is not required for each user.

Although the embodiments of the invention described below are tailored for a mobile telephone system, it should be understood that the same techniques may be applied to any other system for communicating data using propagating energy, such as sonar systems, optic systems, and systems operating at any other range in the frequency spectrum, by adjusting the hardware physical design parameters to be appropriate for the selected frequency range and propagation medium. Further, the invention may be embodied equally effectively in phased array antennas having different antenna configurations and communication objectives. For example, the invention is equally applicable to mobile telephone systems, satellite communication systems, military communication systems, and so forth. Similarly, the invention is equally applicable to phased array antenna systems with planar arrays, curved arrays, cylindrical arrays, hemispherical arrays, spherical arrays, conical arrays, and so forth.

Due to the ability of the invention to generate multiple beams that each contain unique data for multiple users with a single antenna control device for each antenna element, the invention is well suited to phased array systems with large numbers of antenna elements and beams. However, the invention is equally applicable to antenna systems with any number of elements or beams. In addition, the invention may be embodied in a new antenna system or as an upgrade to an existing antenna system. In particular, an existing data communication system using a phased array antenna may already include at least one programmable phase and gain control device for each antenna element, at least one beam forming computer, and at least one data modulator. Therefore, the present invention may be used to upgrade this type of conventional data communication system to a multi-beam data communication system without the need for extensive additional hardware.

It should be understood that the terms "phase and gain control device" and "gain and phase control device" are used synonymously, and that the "phase" and "gain" control portions may be physically embodied in a single device or in different devices. Further, the phase and gain control devices may be embodied in conventional attenuators and phase shifters, although any suitable device, whether known today or invented in the future, for performing these functions may be employed. Although one phase and gain control device for each antenna element is sufficient to implement the embodiments of the present invention, the antenna may include more than one phase and gain control device for each antenna element.

Turning now to the figures, in which similar reference numerals indicate similar elements in the several figures, FIG. 1 is a functional block diagram illustrating the components of a multi-beam data communication system 10 utilizing the beam encoding technology of the present invention. Generally, the antenna system 10 includes a data source 20 producing data for a large number of users, such as a mobile telephone system. The system 10 includes a beam forming computer 30 that creates control signals to drive an "n-element" phased array antenna 40 to produce "m" beams 42$a$ through 42$m$ encoded with the data received from the data source 20 and directed to "p" receivers 50 located within beam 42$a$, "p" receivers 60 located within beam 42$b$, and so forth through "p" receivers 70 located within beam 42$m$. In a mobile telephone system, for example, each beam typically serves a geographic coverage area containing associated receivers, such as mobile telephones, corresponding to the data produced by the data source 20. In addition, each beam may serve an arbitrary number of users having receivers, represented as "p" users. That is, the beam forming computer 30 drives "n" antenna elements to generate "m" beams that each transmit data to "p" users located within the coverage area of the corresponding beam.

To send the correct data to each user, the beam forming computer 30 includes a data sorter 32 that assigns the data produced by the data source 20 among the "m" beams. Typically, the data sorter 32 identifies the location of each user and assigns that user's data to the beam with the corresponding coverage area. To do so, the beam forming computer 30 includes an encoder 34 that encodes each user's data into a corresponding beam, and a control signal generator 36 that drives the "n" phase and gain control devices of the phased array antenna 40 to generate the "m" beams with the encoded data multiplexed into the appropriate beams. This allows the receivers 50, 60 and 70 to receive and decode the data for the associated users. It should be understood that all of these elements may be deployed in a combined enclosure as part of the beam forming computer 30, as suggested by FIG. 1, or each element may be deployed in a separate enclosure, or they may be combined in any manner suitable to a particular application. In addition, each element may be located in a single physical location, or it may be distributed in a network environment.

On the receive side, the receiver 52$a$ receives beam 42$a$ and decoder 54$a$ decodes this beam to extract one user's data, receiver 52$b$ also receives beam 42$a$ and decoder 54$b$ decodes this beam to extract another user's data, and so forth through receiver 52$p$ which receives beam 42$a$ and decoder 54$p$ which decodes this beam to extract another user's data. Similarly, the receiver 62$a$ receives beam 42$b$ and decoder 64$a$ decodes this beam to extract one user's data, receiver 62b also receives beam 42b and decoder 64b decodes this beam to extract another user's data, and so forth through receiver 62p which receives beam 42b and decoder 64p which decodes this beam to extract another user's data. This is typical for all of the "m" beams, as represented by the receiver 72a which receives beam 42m and decoder 74a which decodes this beam to extract one user's data, receiver 72b which also receives beam 42m and decoder 74b which decodes this beam to extract another user's data, and so forth through receiver 72p which receives beam 42m and decoder 74p which decodes this beam to extract yet another user's data.

Generally stated, the control signal generator 36 drives the phased array antenna 40, which includes an arbitrary number of "n" antenna elements that each have at least one gain and phase control device that can be individually controlled by the control signal generator 36, to emit an arbitrary number of "m" beams. Each beam is multiplexed with encoded data for an arbitrary number of "p" users located within the coverage area of the corresponding beam. In particular, the control signal applied to the phase and gain control device for each antenna element consists of a total gain and a total phase shift for each data increment, which changes from data increment to data increment at the "chip" rate to reflect changes in the underlying data. However, this total gain and phase shift signal for each data increment is composed of the vector sum of "m" beam components, one for each beam, which allows the antenna to emit "m" beams simultaneously. Further, each beam component is composed the vector sum of "p" data signals, one for each user located within the beam, which allows each beam to simultaneously transmit data to "p" users located within the coverage area of that beam. In addition, several multiplexing schemes may be used to assign multiple users to each beam, such as frequency division and orthogonal code multiplexing. Further, several coding schemes may be used to encode the data signals by embedding coding parameters that represent user data into the various control signals, such as frequency shift key and phase shift key encoding.

The beam encoder 34 generates the coding parameters for each desired encoding scheme and supplies the coding parameters to the control signal generator 36. For example, the beam encoder 22 may generate phase shift key parameters for use with an orthogonal code multiplexing scheme, or it may generate phase shift or frequency shift key parameters for use with a frequency division multiplexing scheme. In each instance, the beam encoder 34 coordinates its coding scheme with the operational specifications for the beam decoders 54a–p, 64a–p and 74a–p. That is, the beam encoder 34 generates coding parameters that the beam decoders are configured to detect when they are properly reflected in the control signals created by the control signal generator 36 and applied to the phase and gain control devices of the antenna array 40. The beam encoder 34 may also coordinate with the decoders to change coding parameters and techniques on demand, which is similar to conventional "code hopping," "frequency hopping," and similar techniques. Stated generally, the beam encoder 34 ensures that the coding parameters are selected to properly synchronize the operation of the beam decoders with the control signal generator 36, and that the control signals and beams will be within the operational ranges of the associated devices.

The control signal generator 36 receives the coding parameters from the beam encoder 34 and a clock signal corresponding to the data transmission or "chip" rate and embeds the coding parameters into the control signals in accordance with the clock signal to produce control signal time functions. These control signals are applied to the phase and gain control devices of the antenna array 40 to cause the array to generate the "m" encoded beams simultaneously. In particular, the control signal for each antenna element includes a total gain and total phase shift representing the vector of components for each desired beam, which in turn contain the vector sums of data signals for users located with the corresponding beam. The total gain and total phase shift for each antenna element is then applied to the phase and gain control device for the corresponding antenna element, which produces "m" encoded beams that each contain data for the users located within the corresponding beam. Specific methodologies for multiplexing each beam to contain data for multiple users including frequency division and orthogonal code multiplexing, and for encoding the data for multiple users into each beam including frequency shift key and phase shift key encoding, are more fully described below. However, it should be understood that other multiplexing and data encoding schemes can be used.

Figure 2:
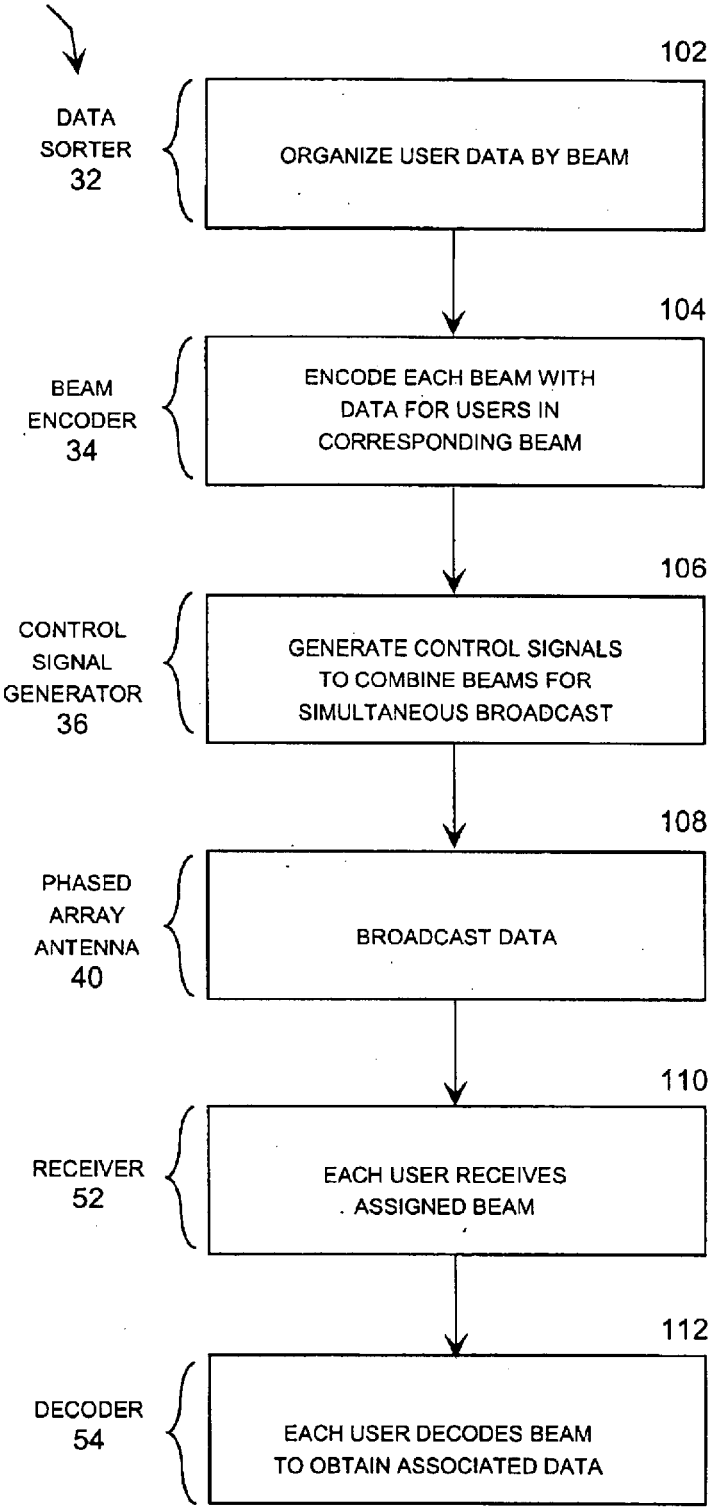
FIG. 2 is a logic flow diagram illustrating a routine for operating a multi-beam data communication system using a phased array antenna to implement an embodiment of the present invention.

FIG. 2 is a logic flow diagram illustrating a routine 100 for generating multiple beams with a phased array data communication system, in which each beam is encoded with data directed to users located within the corresponding beam. In step 102, the data communication system receives user data and organizes the data by beam. In a mobile telephone application, for example, the system may identify the location of each user and organize the data into beams such that each beam is assigned the data for users located within that beam's coverage area. Step 102 is followed by step 104, in which the data communication system encodes each beam with data for users assigned to the corresponding beam. For example, each beam is preferably composed of the vector sum of data signals for the corresponding users, in which each data signal carries data for an individual user. Step 104 is followed by step 106, in which the data communication system combines the beams for simultaneous broadcast. In particular, the data communication system preferably computes a total gain and total phase shift signal for each antenna element representing the vector sum of beam components for that antenna element. Step 106 is followed by step 108, in which the data communication system broadcasts the data by applying the total gain and total phase shift control signals to the corresponding antenna elements. Step 108 is followed by step 110, in which each user receives the data, for example with a mobile telephone unit. Step 110 is followed by step 112, in which user decodes the received beam to extract the data directed to that particular user. In general, routine 100 may be repeated for each clock increment at the "chip" rate to transmit one data bit to each user for each clock increment.

Figure 3:
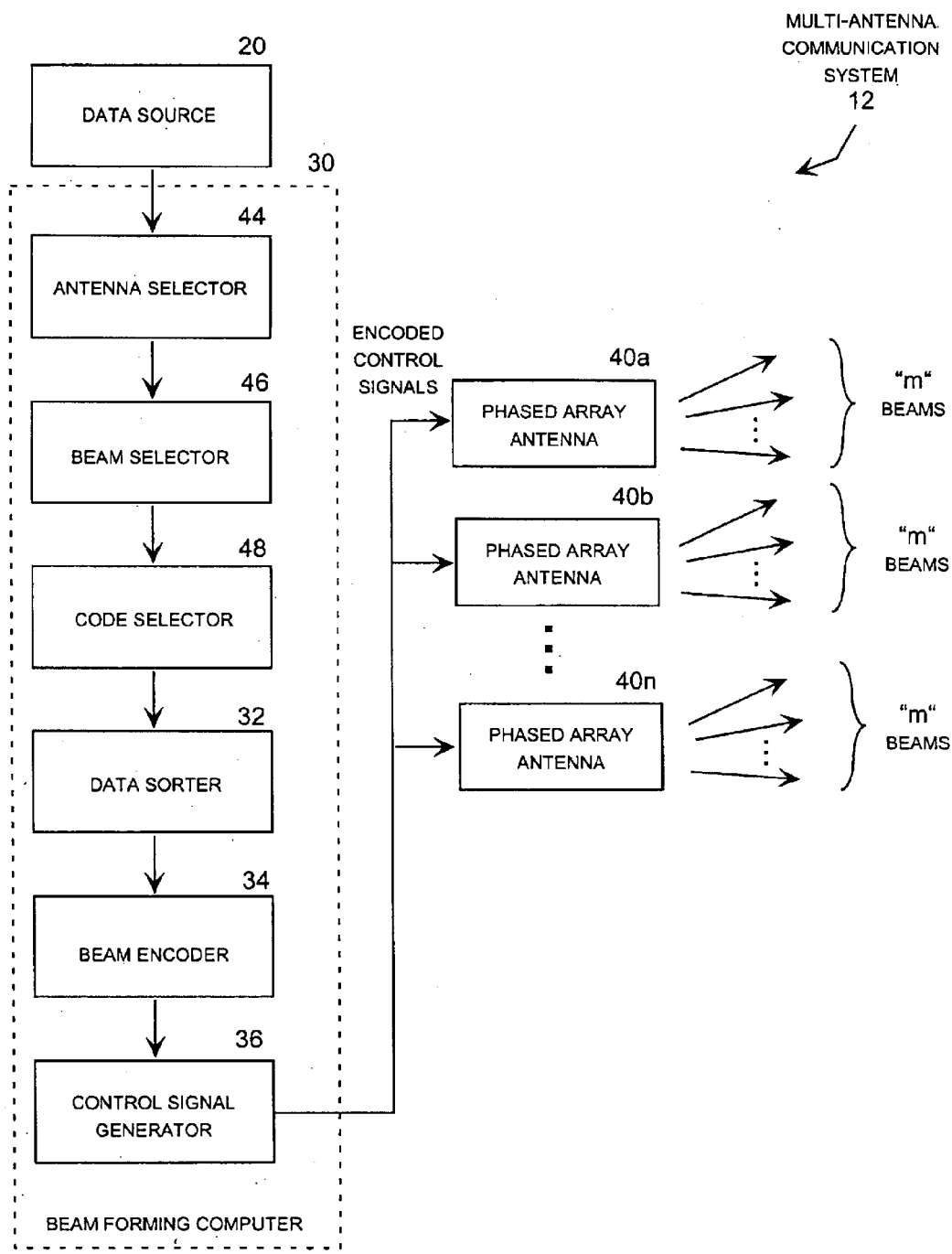
FIG. 3 is a block diagram of an expanded multi-beam data communication system including an antenna selector, a beam selector, and a code selector.

FIG. 3 is a block diagram of an expanded multi-antenna, multi-beam phased array data communication system 12, which includes the components of the antenna system 10 shown in FIG. 1 along with additional components, including multiple antennas 40a–n, an antenna selector 44, a beam selector 46, and a code selector 48. FIG. 3 illustrates additional functions and components that may be incorporated into a multi-beam communication system 12 to build upon the basic beam encoding and decoding technology shown in FIG. 1. For example, the antenna system 103 may include any number of phased array antennas 40a–40n. That is, the beam encoding technology of the present invention may be used to drive a single phased array antenna to receive multiple beams, or it may be used to drive any number of phased array antennas to receive multiple beams. For example, the antenna system 12 may simultaneously operate more than one antenna, or it may switch among antennas on demand. Further, the antenna system 12 may select desired beam sets for one or more of the antennas on demand, and may select desired code sets for encoding the beams for one or more of the antennas on demand. These functions are implemented by the beam forming computer 30, which generates the control signals that operate phase and gain control elements for the antenna elements within the phased array antennas 40a–40n.

More specifically, the beam forming computer 30 includes the data sorter 32, the beam encoder 34, and the control signal generator 36 described above with reference to FIG. 1, along with one or more additional components including the antenna selector 44, the beam selector 46, and the code selector 48. Again, it should be understood that all of these elements may be deployed in a combined enclosure as part of the beam forming computer 30, as suggested by FIG. 1, or each element may be deployed in a separate enclosure, or they may be combined in any manner suitable to a particular application. In addition, each element may be located in a single physical location, or it may be distributed in a network environment.

In general, the antenna selector 44 allows the beam forming computer 30 to adapt to antenna arrays with different physical configurations, such as those configured for different broadcast volumes and different carrier wavelengths. For example, the antenna selector 44 allows the beam forming computer 30 to select among multiple antennas 40a–40n with different physical configurations, which can each be controlled to broadcast multiple encoded beams. As a result, the beam forming computer 30 can control each of the antennas 40a–40n simultaneously or separately in time, as desired. The antenna selector 44 also allows the beam forming computer 30 to control an antenna with a changing or selectable physical configuration. For example, a particular antenna may include multiple array faces, movable panels, or a pliable array that may be physically altered on demand or in response to external conditions. This operational flexibility brings a wide range of antenna deployment and control schemes under the control of the beam forming computer 30. In particular, multiple arrays may be simultaneously and/or serially controlled by the beam forming computer 30, and the emitted beams may be controlled independently or in combination, as desired for a particular application.

The beam selector 46 allows the beam forming computer 30 to define a desired set of "m" beams for each antenna array under its control. That is, the desired beam pattern may be changed on demand to accommodate a wide range of communication objectives, such as directing data to moving receivers, avoiding known areas where interference may be caused, and so forth. For example, the beam selector 46 allows configurable beam patterns to be defined for multiple antennas under the control of the beam forming computer 30 to implement coordinated multi-antenna, multi-beam communication tasks that may be particularly useful for missile defense, military operations, air traffic control and other applications with multiple communication objectives.

The code selector 48 allows the beam forming computer 30 to select among code sets and coding methodologies for encoding the beams for each multi-beam antenna system under its control. For example, the beam forming computer 30 may switch between frequency division multiplexing and orthogonal code multiplexing on demand. Within the frequency division multiplexing category of beam encoding techniques, the beam forming computer 30 may switch among frequency shift key coding and phase shift key coding on demand. Similarly, within the orthogonal coding multiplexing category of beam encoding techniques, the beam forming computer 30 may switch among orthogonal code sets on demand. This allows the beam forming computer 30 to reuse frequency and orthogonal code sets as desired, for example to avoid interference, to use different coding techniques for different antennas under its control, to take advantage of preexisting equipment available at a particular location, to implement security measures, and to achieve a wide range of other objectives.

Figure 4:
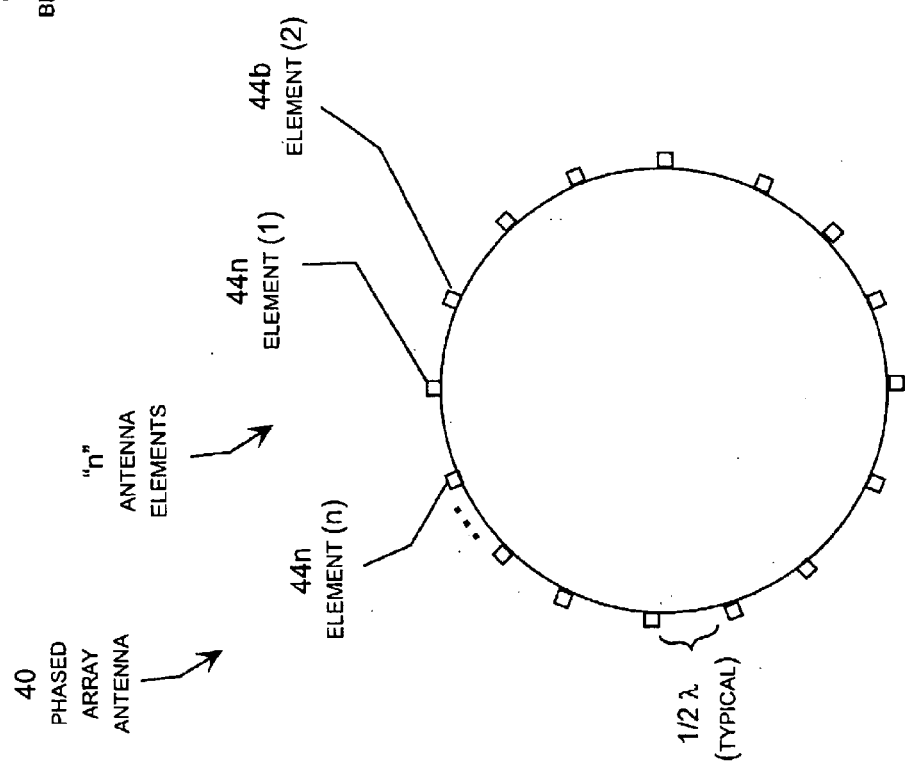
FIG. 4 is a block diagram of a cylindrical phased array antenna that may be used to employ the present invention for a mobile telephone application.

FIG. 4 is a block diagram illustrating a cylindrical phased array antenna 40 that may be well suited to a mobile telephone application. The array includes a number of antenna elements 12, which are identified as element (1), element (2), and so on through element (n). This configuration generally is referred to as an "n-element" array. For a typical mobile telephone system, the number of elements "n" may be moderate, such as 30, and each element may be a conventional transmission device, such as a dipole antenna. Nevertheless, each antenna element may include some type of lens or reflector, but this is not required for the purpose of implementing the encoded beam forming methodology of the present invention. Typically, the antenna elements are placed in the array with a spacing of one-half of the wavelength ($\lambda$) of the intended carrier frequency. Nevertheless, this design parameter may be changed without affecting the encoded beam forming methodology of the present invention.

Figure 5:
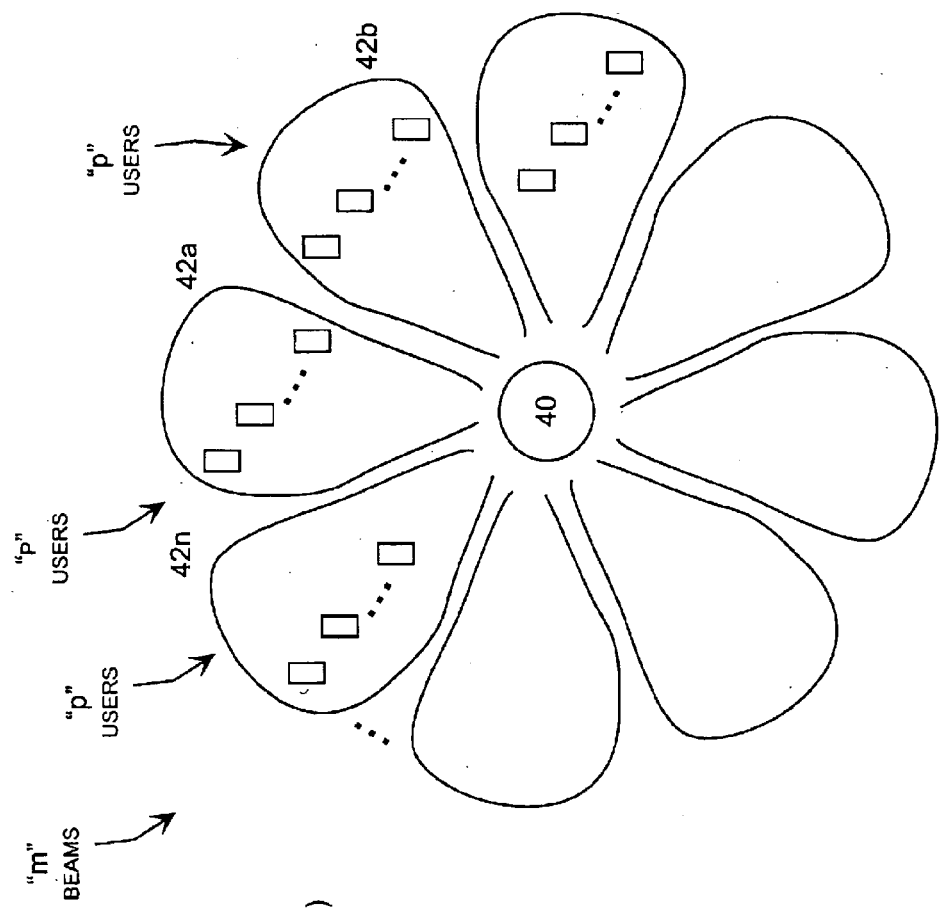
FIG. 5 is a diagram illustrating multiple beams generated by the cylindrical phased array antenna of FIG. 4.

FIG. 5 illustrates a typical beam pattern for the cylindrical phased array antenna 40, which illustrates "m" beams that each contain "p" users within the corresponding coverage area. For a typical mobile telephone application, the number of beams "m" may also be moderate, such as 10. However, the number of simultaneous users served by the antenna 40 is typically large, such as 10,000.

Figure 6:
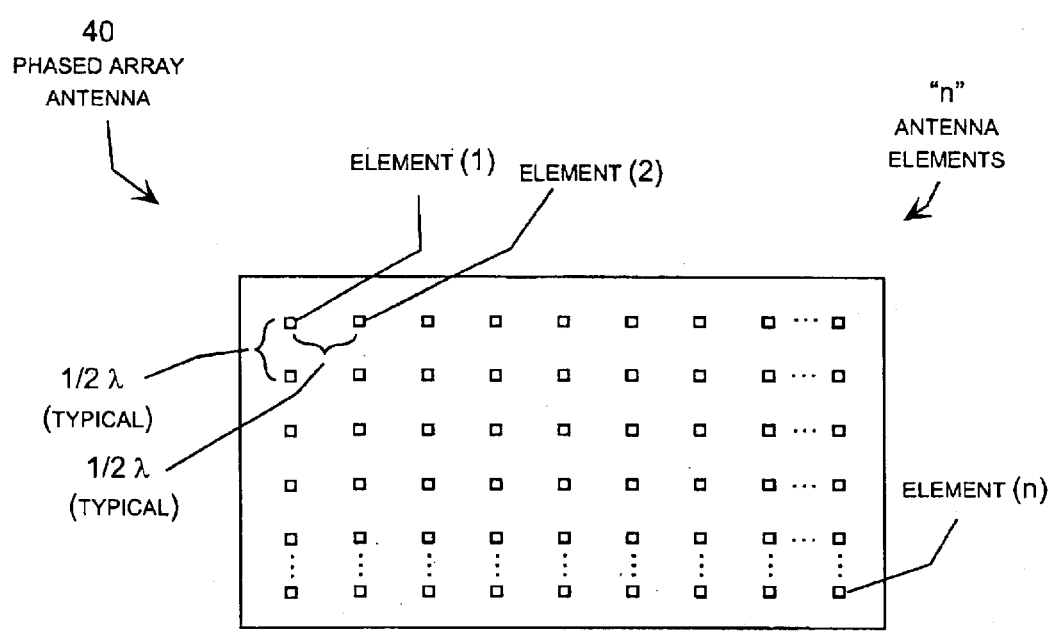
FIG. 6 is a generalized diagram of a phased array antenna.

In addition, it should be appreciated that the encoded beam forming methodology of the present invention may be implemented with any type of phased array antenna configuration, and for any type of antenna application. This is represented in FIG. 6 by the generalized two-dimensional "n-element" phased array antenna 40'. Again, the antenna elements are placed in the array with a spacing of one-half of the wavelength ($\lambda$) of the intended carrier frequency. In addition, the two-dimensional rectangular configuration is merely illustrative, and the antenna 40' may have any desired shape and number of elements, as may be appropriate for a particular application.

FIG. 7 is a block diagram illustrating "m" beams formed by a phased array antenna 40, which are identified as beam (1), beam (2), and so on through beam (m). In general, the phased array antenna 40 can generate a virtually unlimited number of beams, and can simultaneously distinguish among a number approaching "n" beams, where "n" is the number of antenna elements. However, in a typical application, the number of simultaneous beams "m" is usually somewhat smaller than the number of elements "n." For example, in a typical mobile telephone application the number of elements "n" may be 30, and the number of beams "m" may be a smaller number, such as 10. Nevertheless, it will be appreciated that the encoded beam forming methodology of the present invention may be implemented with any number of beams "m" and elements "n." It should also be appreciated that the number of beams "m," the number of antenna elements "n," and the number of users per beam "p" are introduced to serve as parameters in the mathematical description of the encoded beam forming methodology, as set forth below and in various figures.

Turning now to the mathematical development of the antenna element control signals, FIG. 8 is a block diagram illustrating the composition of multiple beams from components received from various antenna elements, and illustrating the corresponding composition of the signals received at various antenna elements as components of multiple beams. In general, the beams are referred to with the coefficient "i" referred to as the "beam number," and the antenna elements are referred to with the coefficient "j" referred to as the "element number." As shown in FIG. 6, the beam number "i" extends from one to "m" beams, and the element number "j" extends from one to "n" elements. Using this nomenclature, a particular beam B(i) can be expressed as a sum of components from each of the antenna elements, which are expressed as AE(1), AE(2), and so forth through AE(n). Similarly, the signal transmitted by a particular antenna AE(j) can be expressed as a sum of components from each of the beams, which are referred to as B(1), B(2), and so forth through B(m). This is shown diagrammatically and mathematically in FIG. 6, which illustrates the physical and mathematical construct of the beam and antenna element equations.

$$B(i) = \sum_{j=1}^{n} AE(j) \quad \text{(beam equation 92)}$$

$$AE(j) = \sum_{i=1}^{m} B(i) \quad \text{(antenna element equation 94)}$$

FIG. 9 illustrates a more specific mathematical expression of the beam equation 92, the antenna element equation 94, and beam parameters 96. Specifically, the beam equation 92 and the antenna element equation 94 may each be expressed as a weighted vector sum of the antenna parameters 96, in which each parameter is represented by a vector with an applied gain and a phase angle.

$$B(i) = \sum_{i=1}^{n} a_{ij} e^{j\phi_{ij}^o}, \text{ where}$$

$a_{11} e^{j\phi_{11}^o}$ = antenna element(1) component of beam(1);

$a_{12} e^{j\phi_{12}^o}$ = antenna element(2) component of beam(1);

$a_{1n} e^{j\phi_{1n}^o}$ = antenna element(n) component of beam(1);

For example, beam (1) can be expressed as shown below, with the other beams defined by changing in beam number:

$$B(1) = a_{11} e^{j\phi_{11}^o} + a_{12} e^{j\phi_{12}^o} + \ldots a_{1n} e^{j\phi_{1n}^o}$$

Similarly, the antenna element signals can be expressed as shown below:

$$AE(j) = \sum_{j=1}^{m} a_{ij} e^{j\phi_{ij}^o} \text{ where}$$

$a_{11} e^{j\phi_{11}^o}$ = beam(1) component of antenna element(1);

$a_{21} e^{j\phi_{21}^o}$ = beam(2) component of antenna element(1);

$a_{m1} e^{j\phi_{m1}^o}$ = beam(m) component of antenna element(1);

For example, the signal for element (1) can be expressed as follows, with the other antenna element signals defined by changing in element number:

$$AE(1) = a_{11} e^{j\phi_{11}^o} + a_{21} e^{j\phi_{21}^o} + \ldots a_{m1} e^{j\phi_{m1}^o}$$

In these equations, the gain (a) and initial phase angle ($\phi^o$), which are referred to as the "beam parameters," are sufficient to describe a set of "m" beams formed by as set of "n" antenna elements.

The beam parameters are represented by the following symbols in the mathematical expressions that describe the antenna's operation:

$a_{ij}$=gain applied to antenna element "ij"

$\phi_{ij}^o$=initial phase shift for antenna element "ij"

Further, the beam parameters themselves can be derived from the antenna physical configuration and the pointing direction of the various beams. Specifically, FIGS. 10 and 11 illustrate the mathematical derivation of the beam parameter from antenna element positions and desired beam pointing directions. The gain (a) applied to each antenna element is set by a physical device controlling the corresponding antenna element in accordance with a desired beam characteristic. For example, the gain may be high if a large signal is desired in a particular beam, for example to transmit data to an intended target. Alternatively, the gain may be set to a low level if a small signal is desired, for example to avoid transmitting data in a particular direction.

The initial phase shift ($\phi^o$) is determined by the physical location of the corresponding antenna element and the pointing direction of the desired beam, as shown below:

$$\phi_{ij}^o = k \vec{ir_j} \cdot \vec{iR_i}$$

where the "r" parameter represents the location of antenna element "j"; the "R" parameter is a unity vector representing the pointing direction of beam "i"; and "k" is a constant. The initial phase angle for the beam "i" component of antenna element "j" can be derived from these parameters as shown below:

$$\vec{ir_j} = (x_j, y_j, z_j)$$

$$\vec{iR_i} = (\cos \alpha_x, \cos \alpha_y, \cos \alpha_z)$$

$$|\vec{iR_i}| = 1$$

$$k = \frac{2\Pi}{\lambda}$$

$$\phi_{ij}^o = \frac{2\Pi}{\lambda} [x_j \cos \alpha_x + y_j \cos \alpha_y + z_j \cos \alpha_z]$$

Figure 12:
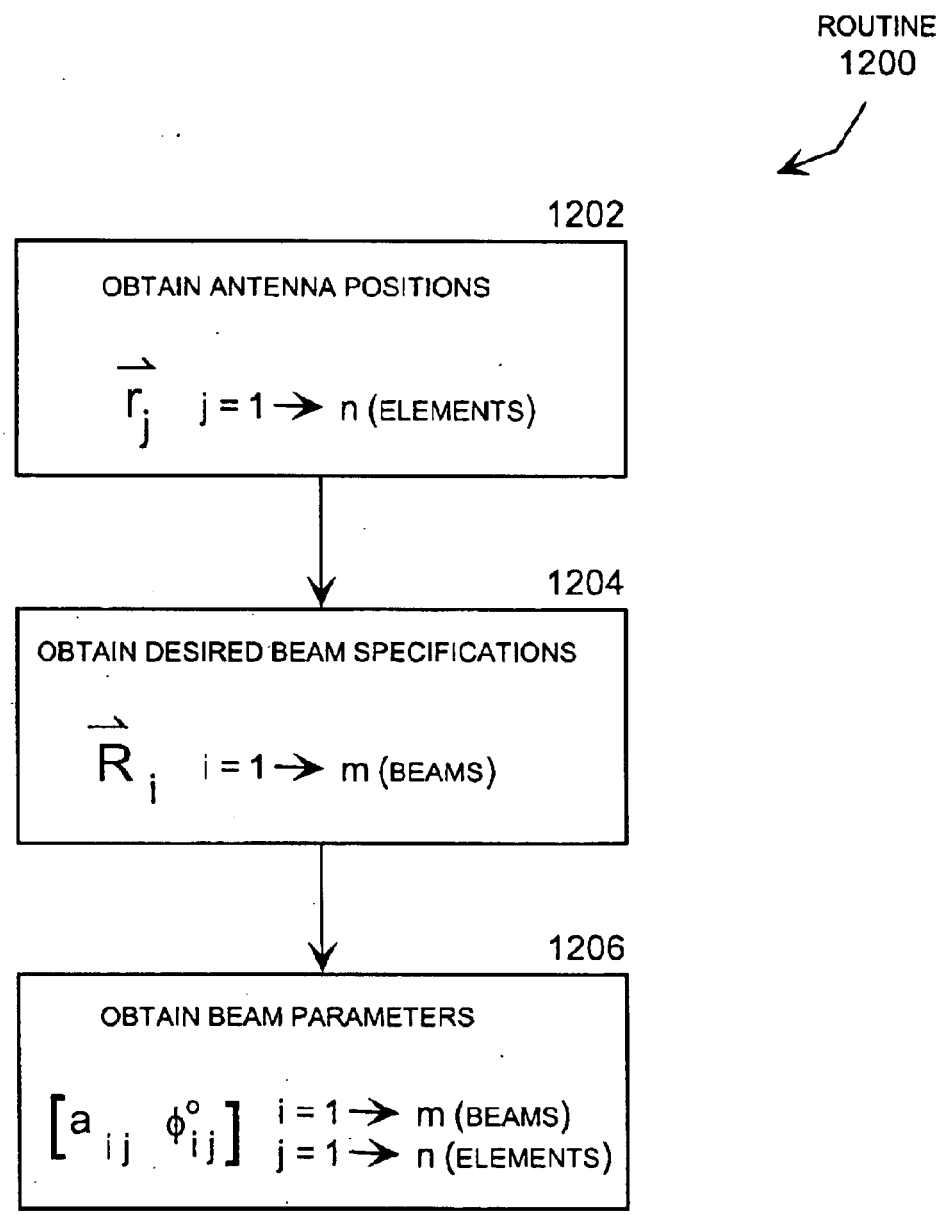
FIG. 12 is a logic flow diagram illustrating a routine for obtaining antenna beam parameter for desired beam sets.

FIG. 12 is a logic flow diagram illustrating a routine 1200 for obtaining antenna beam parameters for desired beam sets, which may be performed by a beam selector. In step 1202, the beam selector gets the antenna element positions, which are represented by the "r" parameter in the equations shown above. Step 1202 is followed by step 1204, in which the beam selector gets the desired beam pointing directions, which are represented by the "R" parameter in the equations shown above. Step 1204 is followed by step 1206, in which the beam selector computes the beam parameters, represented by the "a" and "$\phi^o$" parameters in the equations shown above. Thus, the beam selector can compute the beam parameters for any given antenna configuration and beam set. This allows the beam set to be changed on demand, and also allows the antenna or the antenna configuration to be changed on demand if desired, for example to switch between available antennas or to accommodate changes in the physical configuration of the antenna.

Figure 13:
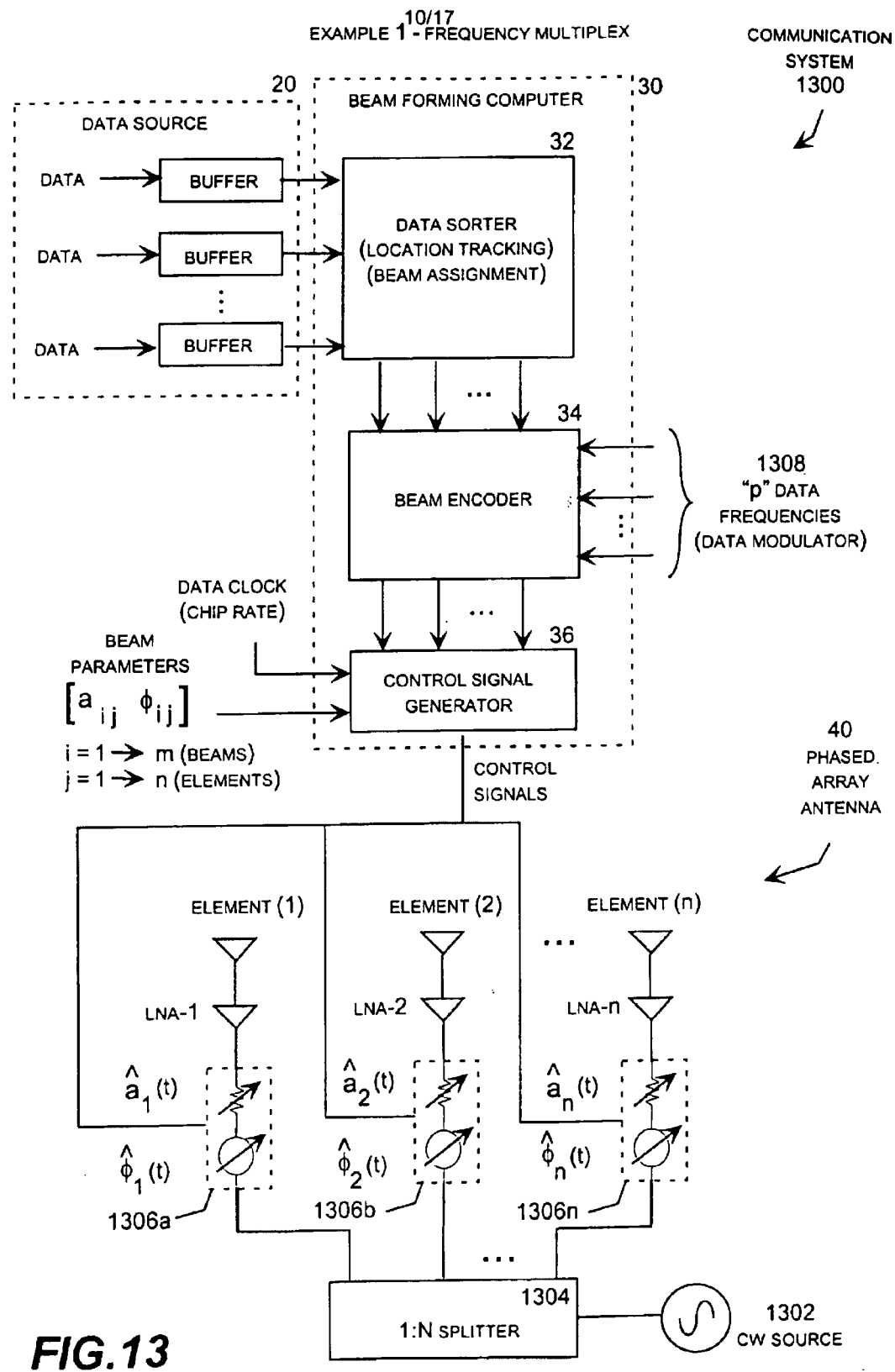
FIG. 13 is a schematic diagram illustrating a first embodiment of the present invention, which includes a phased array antenna system configured to encode data into multiple beams using frequency division multiplexing and frequency or phase shift key encoding technique.

FIG. 13 is a schematic diagram illustrating a generalized phased array data communication system 1300 configured to use an "n-element" phased array antenna 40 to broadcast "m" beams that are each encoded with data for "p" individual users using frequency multiplexing and frequency shift key or phase shift key data encoding. This particular example, which is tailored for use in a mobile telephone application, includes a continuous wave source 1302 that generates the broadcast carrier frequency. The carrier frequency signal is supplied to a 1:N splitter, which in turn supplies "n" carrier signals, one for each antenna element. Each carrier signal is then supplied to a dedicated programmable phase and gain control device 1306a–n, one for each antenna element. The signal for each antenna element then proceeds through its dedicated phase and gain control device, then through a low noise amplifier, and then to the antenna element itself for broadcast.

To create the "m" beams that each carry unique data for "p" specific users, the system 1300 includes a data source 20 and a beam forming computer 30, which includes a data sorter 32, a beam encoder 34, and a control signal generator 36 as described previously with reference to FIG. 1. For example, the data source 20 may provide telephone data dedicated to a large number mobile telephone users at a data transmission or "chip" rate. The data source 20 typically includes a data buffer for each user to temporarily store that user's data, which is received in multi-bit data packets preceded by a data header, so that the data can be supplied one bit at a time to the data sorter 32. The data sorter 32 typically obtains the user's identification information (e.g., mobile unit directory number, EIN or S/N) from the data packer header and uses this data to determine the location of the user from the mobile telephone system, which tracks the location of each user as part of its conventional operation. This allows the data sorter 32 to assign each user's data to corresponding beam covering the area where that user is presently located.

To implement frequency multiplexing, the beam encoder 34 receives "p" data frequencies 1308, one for each of the "p" users assigned to the corresponding beam, from a data modulator. The beam encoder uses these data frequencies and the user data to generate coding parameters for multiplexing the users to the corresponding beam and encoding the user data for those users into the beam. The beam encoder 34 provides these coding parameters to the control signal generator 36, which also receives the beam parameters beam parameters "a" and "$\phi^o$" described previously with reference to FIGS. 6–12, and a timing signal from the data clock at the data transmission or "chip" rate. The control signal generator 36, in turn, generates a control signal for each antenna element, which changes at the data transmission or "chip" rate. The specific mathematical expressions for the control signals used to implement frequency division multiplexing, along with frequency and phase shift key encoding, are described below with reference to FIGS. 16 and 17.

Figure 14:
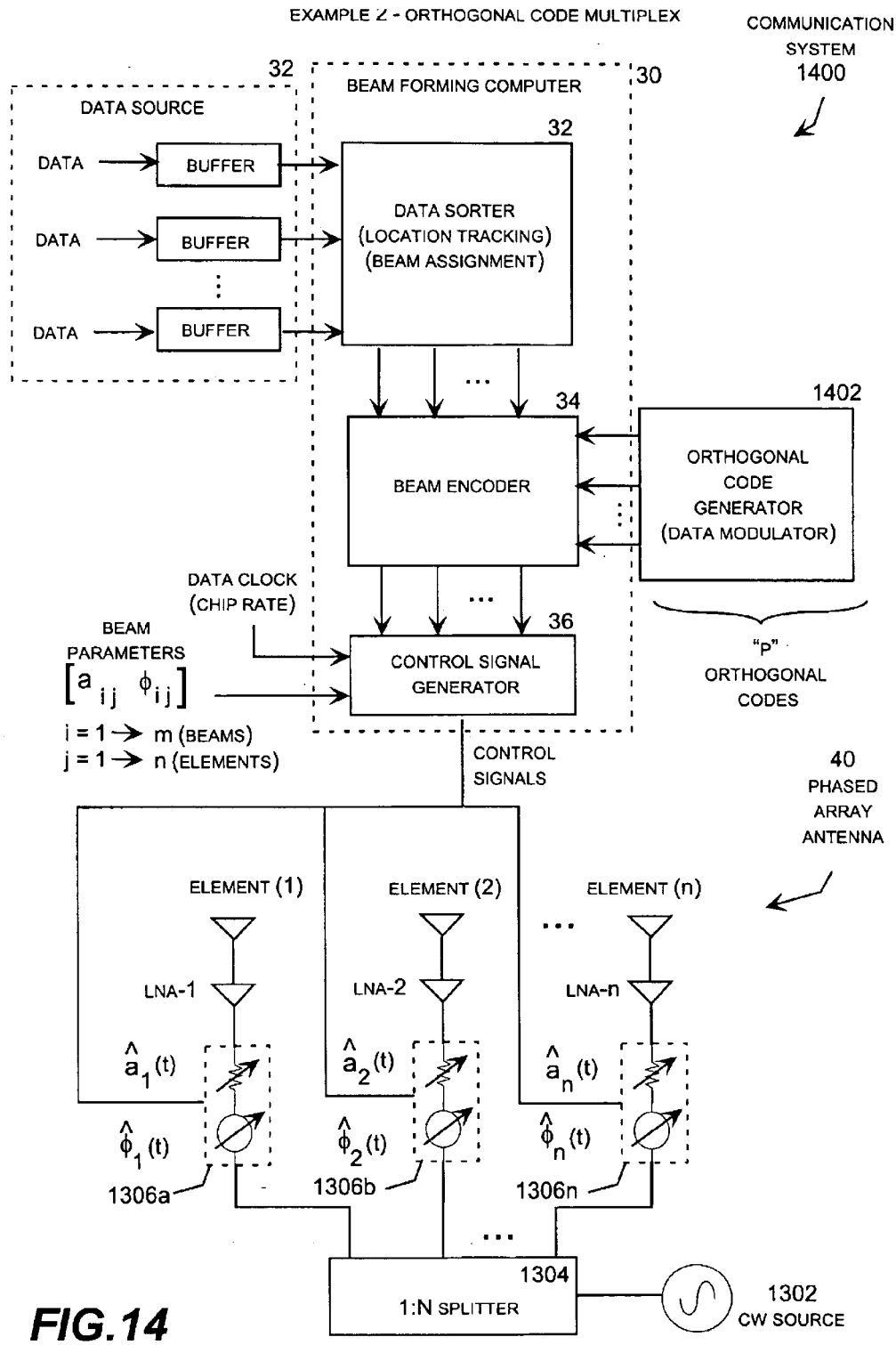
FIG. 14 is a schematic diagram illustrating a second embodiment of the present invention, which includes a phased array antenna system configured to encode data into multiple beams using orthogonal code multiplexing and a phase shift key encoding technique.

FIG. 14 is a schematic diagram illustrating a generalized phased array data communication system 1400 configured to use an "n-element" phased array antenna 40 to broadcast "m" beams that are each encoded with data for "p" individual users using orthogonal code multiplexing and phase shift key encoding. This system is similar to the frequency division multiplexing embodiment shown in FIG. 13, except that an orthogonal code generator 1402 replaces the frequency code generator 1308 as the data modulator. That is, the frequency division and orthogonal code multiplexing systems are similar except for the multiplexing technique, which is reflected in the control signals generated by the control signal generator 36. Again the specific mathematical expressions for the control signals used to implement orthogonal code division multiplexing with phase shift key encoding are described below with reference to FIGS. 16 and 17.

Figure 15:
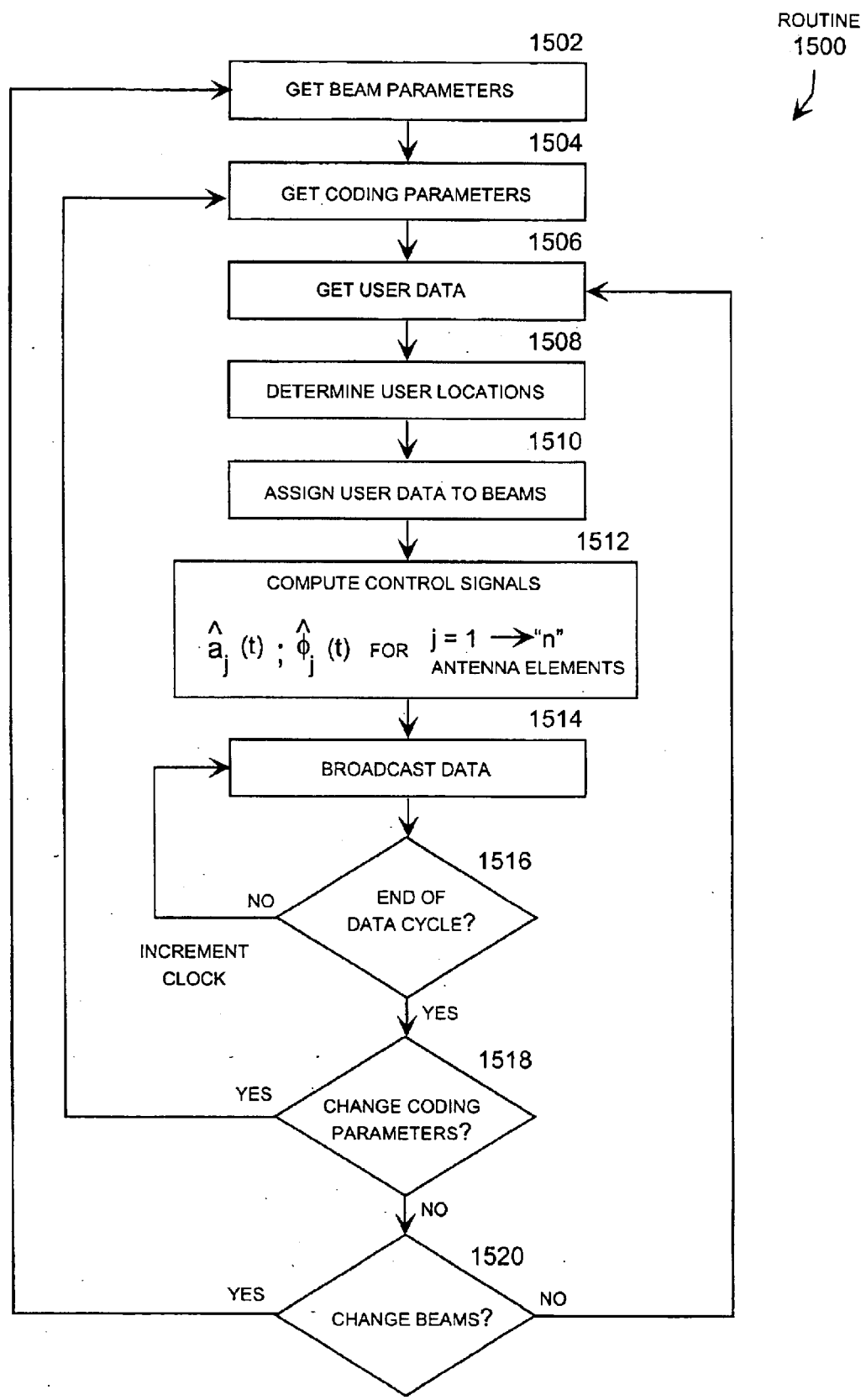
FIG. 15 is a logic flow diagram illustrating a routine for operating a multi-beam data communication system to implement an embodiment of the present invention.

FIG. 15 is a logic flow diagram illustrating a routine 1500 for operating a multi-beam phased array data communication system, such as the systems shown in FIGS. 13 and 14. In step 1502, the beam forming computer 30 gets beam parameters, as described previously with reference to FIGS. 6–12. Step 1502 is followed by step 1504, in which the beam forming 30 computer gets coding parameters from a data modulator, such as frequency shift key, phase shift key or orthogonal coding parameters, as described below with reference to FIGS. 16–17. Step 1504 is followed by step 1506, in which the beam forming computer 30 gets user data, such as mobile telephone data for multiple users. Step 1506 is followed by step 1508, in which the beam forming computer 30 identifies the locations of the users. Step 1508 is followed by step 1510, in which the beam forming computer 30 assigns the user data to the beams such that each beam contains data for users located with the geographic coverage area of the corresponding beam. Step 1510 is followed by step 1512, in which the beam forming computer 30 computes the phase and gain control signals for the various antenna elements for a data transmission increment.

Step 1512 is followed by step 1514, in which beam forming computer 30 receives a data clock signal from a data clock and drives the antenna to transmit data for the associated data period. Step 1514 is followed by step 1516, in which the beam forming computer 30 determines whether the data clock has been incremented through a complete data cycle, such as a CDMA code sequence. More specifically, the data cycle size typically represent the minimum number of data iterations required to transmit detectable information using the selected coding technique. If the data clock has not been incremented through complete data cycle, the "NO" branch loops back to step 1514 until the phase and gain controllers have been incremented through a complete data cycle. If the data clock has been incremented through a complete data cycle, the "YES" is followed to step 1518, in which the beam forming computer 30 determines whether to change the coding parameters. If a change in coding parameters is indicated, the "YES" branch is followed to step 1504, in which the beam forming computer 30 gets new coding parameters. If a change in coding parameters is not indicated, the "NO" branch is followed to step 1520, in which the beam forming compute 30 determines whether to change the beam pattern. If a change in the beam pattern is not indicated, the "NO" branch is followed to step 1506, in which the beam forming computer 30 gets additional user data for transmission. If a change in the beam pattern is indicated, the "YES" branch is followed to step 1502, in which the beam forming computer 30 gets new beam parameters and implements a broadcast cycle for another data cycle using the new beam parameters. Thus, it will be appreciated that routine 1500 allows the data communication system to use various beam patterns and coding techniques to broadcast the user data.

The individual hardware components used to implement the antenna system may be conventional, and the control signals describe methodology that may be used to implement the embodiments of the present invention. These control signals, one for each antenna element, are represented by the following symbols:

$\hat{a}_j(t_k)$=total gain applied to element "j" and time "$t_k$"
$\hat{\phi}_j(t_k)$=total gain applied to element "j" and time "$t_k$"

In these equations, the total gain and total phase shift can be represented by a vector with a magnitude equal to the total gain and an angle equal to the total phase shift. As such, they may be expressed in terms of in-phase and quadrature components as shown below, where "I" represents the in-phase component and "Q" represent the quadrature component, as shown in FIG. 16:

$$\hat{a}_j(t_k) = \sqrt{I_j^2(t_k) + Q_j^2(t_k)}$$

$$\hat{\phi}_j(t_k) = \tan^{-1}\left(\frac{I_j(t_k)}{Q_j(t_k)}\right)$$

Moreover, because the total gain and total phase angle for each element is the vector sum of the beam components for the corresponding element, the in-phase component of the total control signal can be expressed as the vector projection sum of the in-phase components of the beam components; and the quadrature component of the total control signal can be expressed as the vector projection sum of the quadrature components of the beam components, as shown below.

$I_j(t_k)$=in-phase component of the total control signal
$Q_j(t_k)$=quadrature component of the total control signal $$I_j(t_k) = \sum_{i=1}^{m} a_{ij}\cos[\phi_{ij}^o + \text{data}(t_x)] \text{ for } j = 1 \to n \text{ elements}$$

$$Q_j(t_k) = \sum_{i=1}^{m} a_{ij}\sin[\phi_{ij}^o + \text{data}(t_x)] \text{ for } j = 1 \to n \text{ elements}$$

where data ($t_x$)=coding parameter, which depends on the coding technique.

In these equations, the beam parameters "a" and "$\phi^o$" are those described previously with reference to FIGS. 6–12, and the coding parameter "data($t_x$)" is typically embodied as a phase or frequency shift that represents either a "data one" or a "data zero" in accordance with the selected data encoding strategy.

In particular, FIG. 17 shows the specific mathematical control signal expressions for three coding techniques. Example 1A illustrates a frequency multiplexing technique using phase shift key data encoding:

$$I_j(t_x) = \sum_{i=1}^{m}\sum_{k=1}^{p} a_{ij}\cos[\phi_{ij}^o + 2\Pi t_k \delta_{ik} + D_{ik}(t_x)]$$

$$Q_j(t_x) = \sum_{i=1}^{m}\sum_{k=1}^{p} a_{ij}\sin[\phi_{ij}^o + 2\Pi t_k \delta_{ik} + D_{ik}(t_x)]]$$

where $D_{ik}$=0° or 180°=data 1 or 0

In this equation, "j" represents the antenna element number, which extends from one to "n"; "i" represents the beam number, which extends from one to "m"; and "k" represents the user number, which extends from one to "p." The data signal for a particular beam component for a particular antenna element is equal to the initial phase shift "$\phi^o$" adjusted by the modulation signal "$2\Pi t_k \delta_{ik}$" offset by the coding parameter, in this example a phase shift key "$D_{ik}(t_x)$" which varies between a value representing a "data one" and a value representing a "data zero" for each user and time increment to carry digital data. In this coding technique, for example, a phase shift key of zero degrees may represent a "data zero," whereas a phase shift key of 180 degrees may represent a "data one."

In addition, the in-phase and quadrature components for each beam component represent vector projection sums (i.e., the sum of "cos" or "sin" terms) of data signals for "p" users (i.e., the inner summation of data signals for "p" users). Further, the in-phase and quadrature components for each antenna element represent vector projection sums for the "m" beams (i.e., the outer summation of beam components for "m" beams). These in-phase and quadrature components for the antenna elements, in turn, are used to compute the total phase and total phase shift for the corresponding antenna element, as shown in FIG. 16.

It may be instructive to refer back to FIG. 4 at this point to notice that each of the "n" antenna elements over multiple data increments broadcasts "m" beams, which are each composed of multiple data signals for "p" separate users. However, for any particular data increment, each beam component is composed of the vector sum of the data signals for the users within that beam. Similarly, the total control signal for each antenna element is composed of the vector sum of the beam components for that particular antenna element. Therefore, the total control signal for each antenna element for any particular data increment may be computed as a total vector sum, represented by a total gain and a total phase shift, which is applied directly to a single phase and gain control device for each antenna element. Although the control signals for each antenna element changes at the data transmission or "chip" rate to reflect changes in the underlying data, a single phase and gain setting at each antenna element for each data increment is sufficient to transmit the underlying data to all of the users assigned to the several beams.

In addition, because the data signals are encoded and combined through software to generate the control signals for each antenna element, a single data modulator may be used to generate the coding parameters for the entire system. That is, one data modulator may be used to generate the coding parameters for all of the users, which are combined through software to generate the control signals for the various antenna elements at the "chip" rate. Thus, a separate data modulator for each user is not required, as in prior multi-beam data communication systems. Further, the specific coding parameters (i.e., the code sets), and the way in which the coding parameters are used to encode the user data into the control signals (i.e., the coding methodology), may be changed on demand within the beam forming software, without changing the antenna or data communication hardware (other than the selection or setting of the data modulator). Moreover, different antennas may be controlled by the same beam forming computer, and different beam sets may be selected for reach antenna, on demand under the control of the beam forming software. As a result, the same antenna control algorithms reflected in the beam forming computer may be use to drive multiple antennas, to employ different selected beam sets, to employ different code sets, and to employ different coding methodologies on demand.

For example, example 1B illustrates an alternative to example 1A, in this case a frequency multiplexing technique using frequency shift key data encoding:

$$I_j(t_x) = \sum_{i=1}^{m}\sum_{k=1}^{p} a_{ij}\cos[\phi_{ij}^o + 2\Pi t_x \delta_{ik}(t_x)]$$

-continued $$Q_j(t_x) = \sum_{i=1}^{m} \sum_{k=1}^{p} a_{ij}\sin[\phi_{ij}^o + 2\Pi t_x \delta_{ik}(t_x)]$$

where $\delta_{ik}(t_x) = \delta_{ik}^o + \frac{\delta f}{2}$ or $\delta_{ik}^o - \frac{\delta f}{2}$ = data 1 or 0

This equation is similar to the phase shift key example 1A except that the data signal includes a modulator signal adjusted by a frequency shift key equal to one-half of a selected indicator frequency shift "δf" rather than a phase shift key. In this example, increasing the modulator frequency by half the indicator frequency shift to the data frequency may represent a "data one," whereas reducing half the selected frequency shift to the data frequency may represent a "data zero."

Similarly, Example 2 illustrates an orthogonal coding technique:

$$I_j(t_x) = \sum_{i=1}^{m} \sum_{k=1}^{p} a_{ij}\cos[\phi_{ij}^o + CDMA_{ik}(t_x) \oplus D_{ik}(t_x)]$$

$$Q_j(t_x) = \sum_{i=1}^{m} \sum_{k=1}^{p} a_{ij}\sin[\phi_{ij}^o + CDMA_{ik}(t_x) \oplus D_{ik}(t_x)]$$

where $D_{ik} = o°$ or $180°$ = data 1 or 0

This equation is similar to the frequency coding examples 1A and 1B except that the data signal includes an orthogonal code modulation signal that is binary added to a phase shift that represents a data bit. For example, a phase shift of zero degrees may represent a "data one," whereas a phase shift of 180 degrees may represent a "data zero." Further, consecutive data values over time result in a digital data stream that defines an orthogonally coded signal, which allows "p" uses to each extract their particular data from the same orthogonally coded data sequence carried by a particular beam. Accordingly, it will be appreciated that the size of the orthogonal code set, such as 32 bits, represents a minimum number of data bits in a data cycle or frame size required to transmit detectable data using this technique (e.g., see step 1516 in FIG. 15).

FIG. 18A is a block diagram illustrating orthogonal code reuse in a multi-beam data communication system. In particular, an orthogonal code set may be split in half, or two different orthogonal code sets used to multiplex the users into the various beams may be employed in an alternating reuse pattern. A similar reuse pattern may be employed for frequency multiplexing, as shown in FIG. 18B. In general, and regardless of the coding strategy, the ability of the present invention to direct data to specific users in beams significantly improves the opportunities for frequency and code reuse through alternating beams in a mobile telephone system or other multi-beam communication system.

Figure 19:
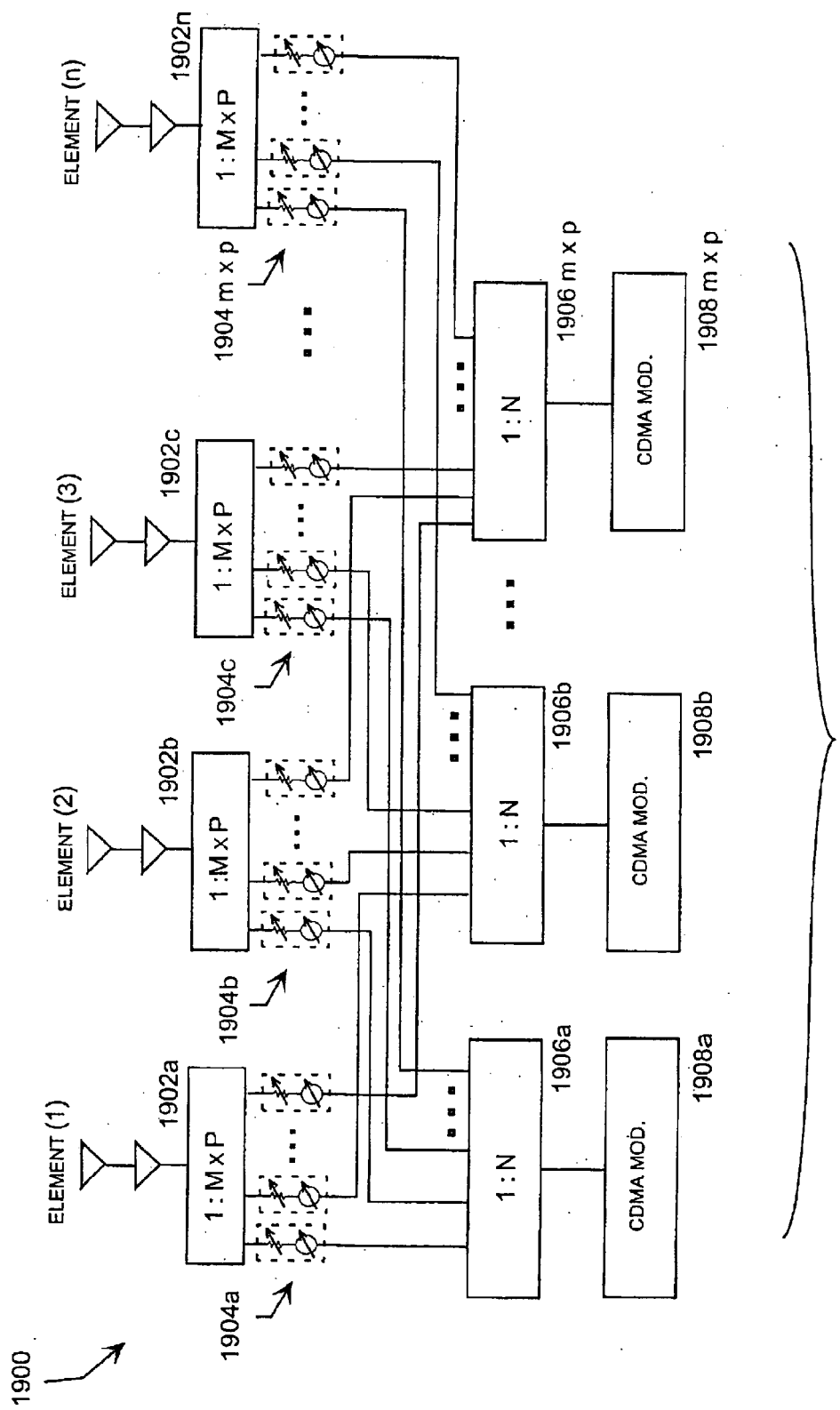
FIG. 19 is a schematic diagram of a first prior art multi-beam data communication system.

FIG. 19 is a schematic diagram of a first prior art multi-beam data communication system for an "n-element" phased array antenna 1900. This system includes a separate data modulator 1908a–n for each user, represented by the product of the number of beams "m" times the number of users per beam "p." Each user's data signal is then split into "n" signals, one for each antenna element. This requires "n" 1:N splitters 1906a–n. In addition, each of the "n" antenna elements requires a separate phase and gain control device for each user. This requires "m" times "p" phase and gain control devices 1904a through 1904mxp. Moreover, each data modulator in this system includes digital circuitry, an intermediate frequency amplitude and/or phase modulator, and an up-converter to the desired RF frequency. In contrast, the data modulators for the embodiments of the present invention are implement in software and, therefore, only require a small section of digital signal processing code implemented within the beam forming computer.

In addition, the technology shown in FIG. 19 to a typical mobile telephone system, however, would be infeasible for most applications due to a large number of antenna hardware and data communication components. For example, the phased array antenna for the transmit base station in a typical mobile telephone system might include 30 antenna elements that generate 10 simultaneous beams to serve 10,000 users. For the configuration shown in FIG. 19, each of the 30 antenna elements would require 10,000 phase and gain control devices, resulting in 300,000 phase and gain control devices. The system would also require 10,000 data modulators to create the data signals for the 10,000 individual users. Therefore, this approach would require 300,000 phase and gain devices and 10,000 data modulators, which would be infeasible for a typical commercial mobile telephone application.

Figure 20:
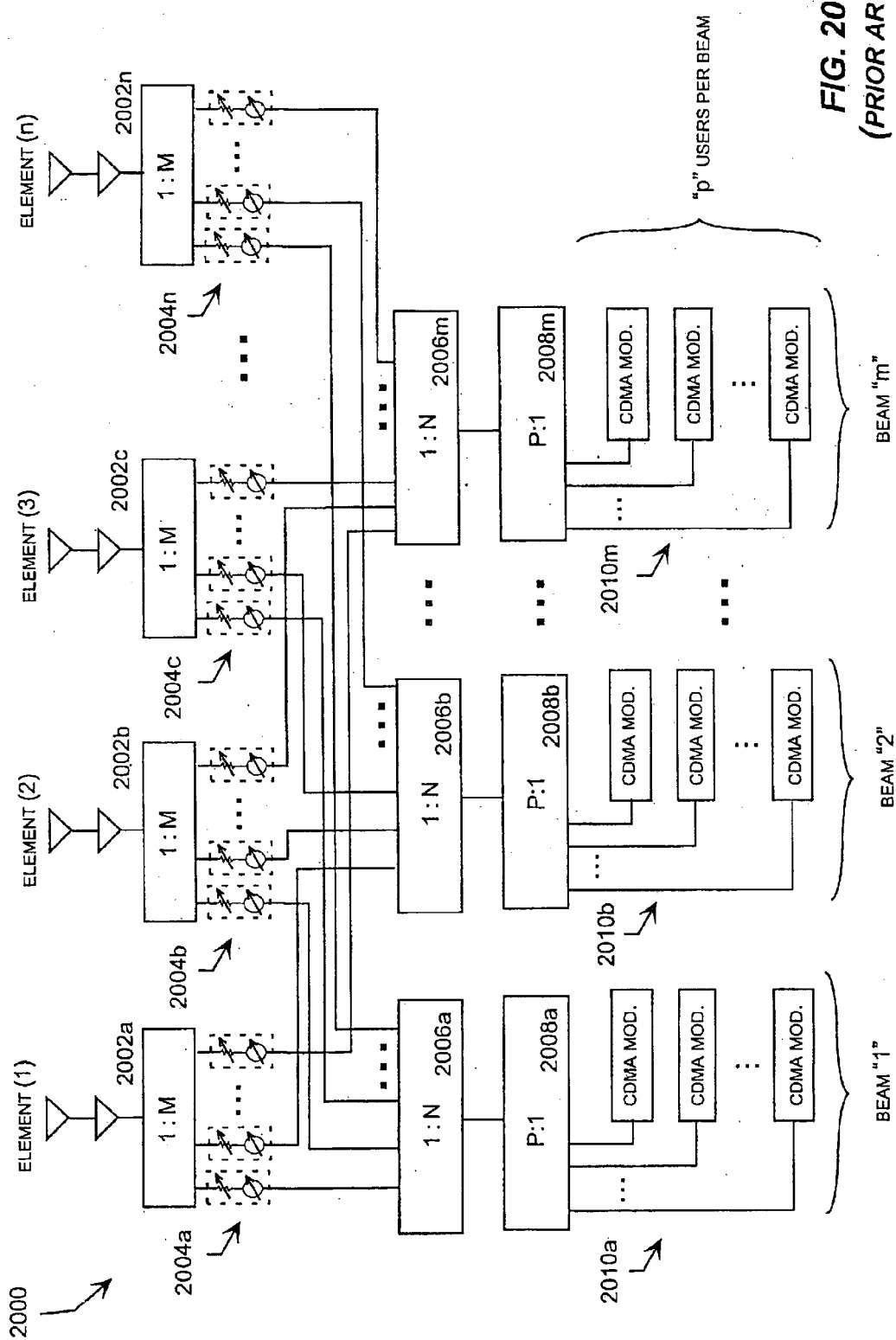
FIG. 20 is a schematic diagram of a second prior art multi-beam data communication system.

FIG. 20 is a schematic diagram of a second alternative prior art multi-beam data communication system an "n-element" phased array antenna 2000. This example is similar to the system 1900 except that the data signals for the various users assigned to a particular beam are combined before they are supplied to the antenna elements. Thus, in this type of system, each antenna element requires a separate phase and gain control device for each beam 2002a–n, rather than a separate phase and gain control device for each user. Although this design choice reduces the number of phase and gain control devices, the system also requires a combiner 2008a–m for each beam. Referring to the previous example, this type of system would require 300 phase and gain control devices (i.e., one for each of the 10 beams at each of the 30 antenna elements), 10 beam combiners (i.e., one for each of the 10 beams) and 10,000 data modulators to create the data signals for the 10,000 individual users. Although the number of antenna hardware components is significantly reduced, the system would still require 10,000 data modulators, which would still be infeasible for a typical commercial mobile telephone system.

Comparing the multi-beam data communication systems 1900 and 2000 shown in FIGS. 19 and 20 to the embodiments of the present invention 1300 and 1400 shown in FIGS. 13 and 14 illustrates that the encoded beam forming technique of the present invention allows a single antenna phase and gain control device to replace "m" or "m" times "p" phase and gain control devices for each antenna element. This greatly reduces the number of antenna hardware components to a single phase and gain control device for each of the "n" antenna elements. Moreover, the present invention also allows a single data modulator to replace multiple data modulators required for each user in the prior systems. This is very significant advantage for a mobile telephone system, in which the number of simultaneous users may be a very large number, such as 10,000.

In the previous mobile telephone example with 10,000 users, for instance, the beam encoding technology of the present invention reduces the required number of data modulators from 10,000 to one. Further, the beam encoding technology reduces the number of antenna hardware components from one set per user, per antenna element (i.e., 300,000) or from one set per beam, per antenna element (i.e., 300) to one set per antenna element (i.e., 30). As a result, the multi-bam data communication systems 1300 and 1400 shown in FIGS. 13 and 14 represent commercially feasible alternatives for a typical mobile telephone system, whereas the multi-bam data communication systems 1900 and 2000 shown in FIGS. 19 and 20 are most likely not feasible alternatives. In addition, embodiments of the present invention will provide similar advantages in cost, weight, size and complexity for other multi-beam communication systems, such as satellite communication systems, military communication systems, and other multi-beam applications.

In view of the foregoing, it will be appreciated that present invention provides an improved system for generating multiple beams, each with data encoded for multiple users, with a phased array broadcast antenna system. It should be understood that the foregoing relates only to the exemplary embodiments of the present invention, and that numerous changes may be made therein without departing from the spirit and scope of the invention as defined by the following claims.

The invention claimed is:

1. A method for operating a phased array antenna system having a plurality of antenna elements, comprising the steps of:
   receiving data for a plurality of users;
   assigning the data to a plurality of beams;
   defining a control signal for each antenna element in which each control signal comprises an associated beam component corresponding to each beam, and computing a total gain and a total phase shift for each antenna element comprising the vector sum of the beam components associated with the corresponding antenna element;
   encoding each beam with the data assigned to that beam by generating the control signals to drive the antenna elements to generate the beams, wherein the combination of the control signals generated for all of the antenna elements causes the antenna to emit the plurality beams in which each beam carries encoded data for its assigned users; and
   broadcasting the beams to deliver the data to the users.

2. The method of claim 1, wherein the step of assigning the data to the plurality of beams comprises:
   determining a location associated with each user;
   identifying a coverage area associated with each beam; and
   assigning the user data to the beams so that the location of each user corresponds to the coverage area of the associated beam.

3. The method of claim 1, further comprising the steps of:
   each user receiving an associated beam; and
   each user decoding the received beam to recover that users associated data.

4. The method of claim a further comprising the steps of:
   selecting an alternate set of desired beams; and
   repeating the steps of claim 1 in connection with the alternate set of desired beams.

5. The method of claim 3, further comprising the steps of:
   selecting an alternate code set; and
   repeating the steps of claim 1 in connection with the alternate code set.

6. The method of claim 3, further comprising the steps of:
   electing an alternate antenna; and
   repeating the steps of claim 1 in connection with the alternate antenna.

7. The method of claim 1, wherein the step of encoding each beam with the data for the corresponding users further comprises the step of computing a vector sum of data signals for users assigned to the corresponding beam, wherein each data signal comprises a coding parameter representing data for a corresponding user.

8. The method of claim 7, wherein the step of encoding each beam with the data for the corresponding users further comprises the steps of:
   computing an in-phase component for the control signal for each antenna element comprising a vector projection sum of in-phase beam components for the corresponding antenna element;
   computing a quadrature component for the control signal for each antenna element comprising a vector projection sum of quadrature beam components for the corresponding antenna element; and
   computing a total gain and a total phase shift for each antenna element from the corresponding in-phase and quadrature components.

9. The method of claim 8, wherein:
   the in-phase beam components for each antenna element include an in-phase component corresponding to each beam; and
   the quadrature beam components for each antenna element includes a quadrature component corresponding to each beam.

10. The method of claim 1, wherein:
    multiple users are assigned to each beams beam using frequency division multiplexing; and
    the user data is encoded into each beam using a frequency shift key coding technique.

11. The method of claim 1, wherein:
    multiple users are assigned to each beam using frequency division multiplexing; and
    the user data is encoded into each beam using a phase shift key coding technique.

12. The method of claim 1, wherein;
    multiple users are assigned to each beams using orthogonal multiplexing; and
    the user data is encoded into each beam using a phase shift key coding technique.

13. A computer storage medium comprising computer executable instructions for performing the method of claim 1.

14. An apparatus configured to perform the method of claim 1.

15. The method of claim 8, wherein the step of encoding each beam with the data for the corresponding users further comprises the step of encoding the beams with frequencies using a frequency shift key coding technique.

16. The method of claim 8, wherein the step of encoding each beam with the data for the corresponding users further comprises the step of encoding the beams with frequencies using a phase shift key coding technique.

17. The method of claim 8, the step of encoding each beam with the data for the corresponding users further comprises the step of encoding the beams using an orthogonal coding technique.

18. A computer storage medium comprising computer executable instructions for performing the method of claim 8.

19. An apparatus configured to perform the method of claim 8.

20. A multi-beam phased array antenna system comprising:
    a plurality of antenna elements;

a phase and gain control device associated with each antenna element; and a beam forming computer configured to generate control signals to drive the phase and gain control devices to create multiple beams, wherein:

each beam is assigned data corresponding to users located within a coverage associated with the corresponding beam, a control signal for each antenna element comprises a total gain and a total phase shift, the control signal control signal for each antenna element comprises a vector sum of beam components in which one beam component corresponds to each beam, and each beam component comprises a vector sum of data signals for users assigned to the corresponding beam, wherein each data signal comprises a coding parameter representing data for an associated user.

21. The antenna system of claim 20, wherein:

the control signal for each antenna element comprises an in-phase component defined by a sum of in-phase beam components for the corresponding antenna element;

the control signal for each antenna element comprises a quadrature component defined by a sum of quadrature beam components for the corresponding antenna element; and the control signal for each antenna element comprises a total gain and a total phase shift for the antenna element bused on the in-phase and quadrature components for the corresponding antenna element.

22. The antenna system of claim 21, wherein:

the in-phase beam components for each antenna element includes an in-phase component corresponding to each beam; and the quadrature beam components for each antenna element includes a quadrature component corresponding to each beam.

23. The antenna system of claim 20 wherein the coding parameters are embedded in the in-phase and quadrature beam components.

24. The method of claim 20, wherein:

multiple users are assigned to each beam using frequency division multiplexing; and the user data is encoded into each beam using a frequency shift key coding technique.

25. The method of claim 20, wherein:

multiple users are assigned to each beam using frequency division multiplexing; and the user data is encoded into each beam using a phase shift key coding technique.

26. The method of claim 20, wherein:

multiple users are assigned to each beam using orthogonal multiplexing; and the user data is encoded into each beam using a phase shift key coding technique.

27. The method of claim 20, wherein the user data is encoded into each beam using coding parameters that are changed on demand.

28. A multi-beam phased array antenna system comprising:

a plurality of antenna elements;

a phase and gain control device associated with each antenna element;

a code selector configured to identify desired coding parameter sets;

a beam selector configured to identify desired beam sets; and a beam forming computer configured to generate control signals to drive the phase and gain control devices to create multiple beams, wherein:

each beam is assigned data corresponding to users located within a coverage associated with the corresponding beam, a control signal for each antenna element comprises a total gain and a total phase shift, and the control signal control signal for each antenna element comprises a vector sum of beam components in which one beam component corresponds to each beam, and each beam component comprises a vector sum of data signals for users assigned to the corresponding beam, wherein each data signal comprises a coding parameter representing data for an associated user.

29. The antenna system of claim 28, wherein:

multiple users are assigned to each beam using frequency division multiplexing; and the user data is encoded into each beam using a frequency shift key coding technique.

30. The method antenna system of claim 28, wherein:

multiple users are assigned to each beam using frequency division multiplexing; and the user data is encoded into each beam using a phase shift key coding technique.

31. The antenna system of claim 28, wherein:

multiple users are assigned to each beam using orthogonal multiplexing; and the user data is encoded into each beam using a phase shift key coding technique.

32. In a beam former for use with a phased array antenna system, an improvement comprising:

the beam former being operative for coding the data and combining the coded data into control signals to drive a plurality of antenna elements to broadcast a plurality of beams, wherein each beam carries data assigned to a plurality of users located within a coverage area associated with the beam, and the control signal for each antenna element comprises a total gain and a total phase shift comprising a vector sum of beam components in which each beam component is associated with a corresponding beam.

33. The beam former of claim 32, wherein the control signal for each antenna element comprises a vector sum of beam components comprising a beam component corresponding to each beam.

34. The beam former of claim 32, wherein each beam component comprises a vector sum of data signals for users assigned to the corresponding beam.

35. The beam former of claim 32 wherein:

multiple users are assigned to each beam using frequency division multiplexing; and the user data is encoded into each beam using a frequency shift key coding technique.

36. The method beam former of 32, wherein:

multiple users are assigned to each beam using frequency division multiplexing; and the user data is encoded into each beam using a phase shift key coding technique.

37. The beam former of claim 32, wherein:

multiple users are assigned to each beam using orthogonal multiplexing; and the user data is encoded into each beam using a phase shift key coding technique.

* * * * *

UNITED STATES PATENT AND TRADEMARK OFFICE
CERTIFICATE OF CORRECTION

PATENT NO.    : 6,788,250 B2
DATED         : September 7, 2004
INVENTOR(S)   : James M. Howell It is certified that error appears in the above-identified patent and that said Letters Patent is hereby corrected as shown below:

Column 23,
Line 11, change "control signal control signal" to -- control signal --.
Line 39, change "claim 20" to -- claim 21 --.
Line 42, "method" to -- antenna system --. (both occurrences)
Lines 47 and 52, change "method" to -- antenna system --.

Column 24,
Line 24, change "method" to -- antenna system --.
Line 60, change "method" to -- beam former --.

Signed and Sealed this

Second Day of August, 2005

JON W. DUDAS
*Director of the United States Patent and Trademark Office*